US012256437B2

(12) United States Patent
Abedini et al.

(10) Patent No.: US 12,256,437 B2
(45) Date of Patent: Mar. 18, 2025

(54) RANDOM ACCESS CONFIGURATION ASSOCIATED WITH CROSS-LINK INTERFERENCE

(71) Applicant: QUALCOMM Incorporated, San Diego, CA (US)

(72) Inventors: Navid Abedini, Basking Ridge, NJ (US); Yan Zhou, San Diego, CA (US); Qian Zhang, Basking Ridge, NJ (US); Tao Luo, San Diego, CA (US); Junyi Li, Fairless Hills, PA (US)

( * ) Notice: Subject to any disclaimer, the term of this patent is extended or adjusted under 35 U.S.C. 154(b) by 589 days.

(21) Appl. No.: 17/572,537

(22) Filed: Jan. 10, 2022

(65) Prior Publication Data

US 2023/0224971 A1 Jul. 13, 2023

(51) Int. Cl.
*H04W 74/0833* (2024.01)
*H04L 5/00* (2006.01)
*H04W 74/00* (2009.01)

(52) U.S. Cl.
CPC ....... *H04W 74/0833* (2013.01); *H04L 5/0051* (2013.01); *H04L 5/0053* (2013.01); *H04L 5/006* (2013.01); *H04W 74/004* (2013.01)

(58) Field of Classification Search
CPC ............ H04W 74/0833; H04W 74/004; H04L 5/0051; H04L 5/0053; H04L 5/006
USPC ......................................................... 370/329
See application file for complete search history.

(56) References Cited

U.S. PATENT DOCUMENTS

2018/0123650 A1* 5/2018 Yu ......................... H04B 7/0695
2019/0363810 A1* 11/2019 Luo ....................... H04B 17/345

FOREIGN PATENT DOCUMENTS

WO   WO-2021231811 A1   11/2021
WO   WO-2021248397 A1   12/2021

OTHER PUBLICATIONS

International Search Report and Written Opinion—PCT/US2022/082108—ISA/EPO—Mar. 17, 2023.

* cited by examiner

*Primary Examiner* — Chi Tang P Cheng

(57) ABSTRACT

Methods, systems, and devices for wireless communications are described. Generally, a wireless device may select random access channel occasions (ROs) based jointly on synchronization signal block (SSB) measurements and cross-link interference (CLI) measurements. The base station may configure the wireless device with a set of SSB occasions during which to measure SSBs and a set of interference measurement occasions on which to measure CLI caused by other wireless devices. The wireless device may perform measurements on the received SSBs to determine channel quality for communications with the base station, and CLI measurements during the interference measurement occasions to determine whether CLI exceeds a threshold. The wireless device may then select a beam and an associated RO (e.g., a full duplex RO or a half duplex RO) on which to transmit the random access message using the selected beam.

28 Claims, 17 Drawing Sheets

RANDOM ACCESS CONFIGURATION ASSOCIATED WITH CROSS-LINK INTERFERENCE

FIELD OF TECHNOLOGY

The following relates to wireless communications, including random access configuration associated with cross-link interference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access configuration associated with cross-link interference. Generally, a wireless device (e.g., such as an integrated access and backhaul (IAB) node, a user equipment (UE), or the like) may select random access channel occasions (ROs) based jointly on synchronization signal block (SSB) measurements and cross-link interference (CLI) measurements. For example, the base station may configure the wireless device with a set of SSB occasions during which to measure SSBs transmitted by the base station, and a set of interference measurement occasions (e.g., reference signal resources, sounding reference signal (SRS) resources, etc.) on which to measure CLI caused by other wireless devices. The wireless device may perform measurements on the received SSBs to determine channel quality for communications with the base station. The wireless device may also perform CLI measurements during the interference measurement occasions, and may determine whether CLI exceeds a threshold (e.g., which may be configured by the base station). The wireless device may then select a beam and an associated RO on which to transmit the random access message using the selected beam (e.g., to establish a connection or to perform a beam failure recovery procedure). The wireless device may also use the channel quality (e.g., SSB) measurements and CLI measurements to select between a full duplex RO and a half duplex RO. For example, if the measured CLI exceeds the configured CLI threshold, then the wireless device may transmit the random access message on a half-duplex RO (e.g., thus avoiding causing CLI to another wireless device by using a full duplex RO). If the measured CLI is less than the configured CLI, then the wireless device may select a full duplex RO.

In some examples, the base station may configure the wireless device with transmit power configuration information, and the wireless device may perform power control for the random access message based on measured CLI. The UE may reduce a transmit power to cause less CLI to neighboring wireless devices based on measured CLI. For instance, the wireless device may determine whether measured CLI exceeds a threshold (e.g., by a configured step-size), and if so, the wireless device may apply a maximum transmit power to some configured value. In some examples, the wireless device may determine whether the measured CLI exceeds a threshold (e.g., by a configured step-size), and if so, the wireless device may reduce a transmit power by a configured step-size. In some examples, if the measured CLI does not exceed the threshold, then the wireless device may refrain from applying such restrictions, and may increase a transmit power for retransmission based on power ramping step size, and assuming no further limits.

In some examples, the wireless device may select an uplink beam based on downlink channel quality measurements, but may refine the selected uplink beam based on CLI measurements. The wireless device may perform CLI measurements using a set of beams that are QCL with the selected uplink beam, and may transmit the random access message using one of the set of QCL beams.

A method for wireless communications at a wireless device is described. The method may include receiving, from a base station, control signaling indicating a set of multiple synchronization signal block occasions associated with measuring downlink reference signals, and a set of multiple interference measurement occasions associated with measuring cross-link interference, performing a first set of multiple measurements of a set of multiple downlink reference signals received via the set of multiple synchronization signal block occasions, and a second set of multiple measurements of a set of multiple reference signals received via the set of multiple interference measurement occasions, selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams, and transmitting, to the base station, a random access message via the first random access occasion using the first beam.

An apparatus for wireless communications at a wireless device is described. The apparatus may include a processor, memory coupled with the processor, and instructions stored in the memory. The instructions may be executable by the processor to cause the apparatus to receive, from a base station, control signaling indicating a set of multiple synchronization signal block occasions associated with measuring downlink reference signals, and a set of multiple interference measurement occasions associated with measuring cross-link interference, perform a first set of multiple measurements of a set of multiple downlink reference signals received via the set of multiple synchronization signal block occasions, and a second set of multiple measurements of a set of multiple reference signals received via the set of multiple interference measurement occasions, select, based on the first set of multiple measurements and the second set of multiple measurements, a first random access occasion associated with a first beam from a set of multiple random access occasions, each random access occasion of the set of multiple random access occasions associated with a respective beam of a set of multiple beams, and transmit, to the base station, a random access message via the first random access occasion using the first beam.

Another apparatus for wireless communications at a wireless device is described. The apparatus may include means for receiving, from a base station, control signaling indicating a set of multiple synchronization signal block occasions associated with measuring downlink reference signals, and a set of multiple interference measurement occasions associated with measuring cross-link interference, means for performing a first set of multiple measurements of a set of multiple downlink reference signals received via the set of multiple synchronization signal block occasions, and a second set of multiple measurements of a set of multiple reference signals received via the set of multiple interference measurement occasions, means for selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams, and means for transmitting, to the base station, a random access message via the first random access occasion using the first beam.

A non-transitory computer-readable medium storing code for wireless communications at a wireless device is described. The code may include instructions executable by a processor to receive, from a base station, control signaling indicating a set of multiple synchronization signal block occasions associated with measuring downlink reference signals, and a set of multiple interference measurement occasions associated with measuring cross-link interference, perform a first set of multiple measurements of a set of multiple downlink reference signals received via the set of multiple synchronization signal block occasions, and a second set of multiple measurements of a set of multiple reference signals received via the set of multiple interference measurement occasions, select, based on the first set of multiple measurements and the second set of multiple measurements, a first random access occasion associated with a first beam from a set of multiple random access occasions, each random access occasion of the set of multiple random access occasions associated with a respective beam of a set of multiple beams, and transmit, to the base station, a random access message via the first random access occasion using the first beam.

Some examples of the method, apparatuses, and non-transitory computer-readable medium described herein may further include operations, features, means, or instructions for receiving, from the base station, the control signaling indicating a downlink channel quality threshold and a cross-link interference threshold, where selecting the first random access occasion may be based on at least one of the first set of multiple measurements satisfying downlink channel quality threshold and at least one of the second set of multiple measurements satisfying the cross-link interference threshold.

Some examples of the method, apparatuses, and non-transitory computer-readable medium described herein may further include operations, features, means, or instructions for receiving, from the base station, control signaling indicating a joint threshold associated with downlink channel quality and cross-link interference, where selecting the first random access occasion may be based on a combination of a first measurement of the first set of multiple measurements and a second measurement of the second set of multiple measurements satisfying the joint threshold.

In some examples of the method, apparatuses, and non-transitory computer-readable medium described herein, the selecting may include operations, features, means, or instructions for selecting the first random access occasion that may be a full duplex random access occasion based on at least one of the first set of multiple measurements satisfying a downlink channel quality threshold and at least one of the second set of multiple measurements satisfying a cross-link interference threshold.

In some examples of the method, apparatuses, and non-transitory computer-readable medium described herein, the selecting may include operations, features, means, or instructions for selecting the first random access occasion that may be a half-duplex random access occasion based on at least one of the first set of multiple measurements satisfying a downlink channel quality threshold and at least one of the second set of multiple measurements failing to satisfy a cross-link interference threshold.

Some examples of the method, apparatuses, and non-transitory computer-readable medium described herein may further include operations, features, means, or instructions for receiving, from the base station, power control configuration information including at least one of a first step-size for reducing transmit power, a second step-size for increasing transmit power, a threshold measurement value for the second set of multiple measurements based on which the wireless device may be instructed to adjust its transmit power, a threshold transmit power, or any combination thereof.

Some examples of the method, apparatuses, and non-transitory computer-readable medium described herein may further include operations, features, means, or instructions for refraining from transmitting the random access message at a transmit power that exceeds the threshold transmit power based on the second set of multiple measurements failing to satisfy a cross-link interference threshold.

Some examples of the method, apparatuses, and non-transitory computer-readable medium described herein may further include operations, features, means, or instructions for retransmitting the random access message at a transmit power that exceeds the threshold transmit power by the second step-size based on the second set of multiple measurements satisfying a cross-link interference threshold.

Some examples of the method, apparatuses, and non-transitory computer-readable medium described herein may further include operations, features, means, or instructions for reducing the transmit power for transmitting the random access message by the first step-size for reducing transmit power based on the second set of multiple measurements failing to satisfy a cross-link interference threshold.

In some examples of the method, apparatuses, and non-transitory computer-readable medium described herein, transmitting the random access message may include operations, features, means, or instructions for transmitting the random access message during an initial access procedure.

In some examples of the method, apparatuses, and non-transitory computer-readable medium described herein, transmitting the random access message may include operations, features, means, or instructions for transmitting the random access message during a beam failure recovery procedure.

In some examples of the method, apparatuses, and non-transitory computer-readable medium described herein, the selecting may include operations, features, means, or instructions for identifying a first candidate beam based on the first set of multiple measurements, identifying a second candidate beam that may have a quasi-co-location relationship with the first candidate beam, and selecting one of the first candidate beam or the second candidate beam as the first beam based on the second set of multiple measurements.

Some examples of the method, apparatuses, and non-transitory computer-readable medium described herein may further include operations, features, means, or instructions for performing a third set of multiple measurements of the set of multiple downlink reference signals received via the set of multiple synchronization signal block occasions using the first beam, where transmitting the random access message using the first beam may be based on the third set of multiple measurements.

Some examples of the method, apparatuses, and non-transitory computer-readable medium described herein may further include operations, features, means, or instructions for estimating a measurement offset value associated with the first beam and applying the estimated measurement offset value to the first set of multiple measurements, where transmitting the random access message on the first random access occasion may be based on applying the estimated measurement offset value to the first set of multiple measurements.

Some examples of the method, apparatuses, and non-transitory computer-readable medium described herein may further include operations, features, means, or instructions for performing a beam sweeping procedure using the set of multiple candidate beams including the second candidate beam to receive a subset of the set of multiple reference signals.

In some examples of the method, apparatuses, and non-transitory computer-readable medium described herein, receiving the control signaling may include operations, features, means, or instructions for receiving the control signaling including an indication of a periodicity and a repetition count for the set of multiple interference measurement occasions.

A method for wireless communications at a base station is described. The method may include transmitting, to a wireless device, control signaling indicating a set of multiple synchronization signal block occasions associated with measuring downlink reference signals, and a set of multiple interference measurement occasions associated with measuring cross-link interference, receiving, from the wireless device on a first beam, a random access message via a first random access occasion associated with the first beam, and transmitting, to the wireless device responsive to receiving the random access message, a second random access message using the first beam.

An apparatus for wireless communications at a base station is described. The apparatus may include a processor, memory coupled with the processor, and instructions stored in the memory. The instructions may be executable by the processor to cause the apparatus to transmit, to a wireless device, control signaling indicating a set of multiple synchronization signal block occasions associated with measuring downlink reference signals, and a set of multiple interference measurement occasions associated with measuring cross-link interference, receive, from the wireless device on a first beam, a random access message via a first random access occasion associated with the first beam, and transmit, to the wireless device responsive to receiving the random access message, a second random access message using the first beam.

Another apparatus for wireless communications at a base station is described. The apparatus may include means for transmitting, to a wireless device, control signaling indicating a set of multiple synchronization signal block occasions associated with measuring downlink reference signals, and a set of multiple interference measurement occasions associated with measuring cross-link interference, means for receiving, from the wireless device on a first beam, a random access message via a first random access occasion associated with the first beam, and means for transmitting, to the wireless device responsive to receiving the random access message, a second random access message using the first beam.

A non-transitory computer-readable medium storing code for wireless communications at a base station is described. The code may include instructions executable by a processor to transmit, to a wireless device, control signaling indicating a set of multiple synchronization signal block occasions associated with measuring downlink reference signals, and a set of multiple interference measurement occasions associated with measuring cross-link interference, receive, from the wireless device on a first beam, a random access message via a first random access occasion associated with the first beam, and transmit, to the wireless device responsive to receiving the random access message, a second random access message using the first beam.

Some examples of the method, apparatuses, and non-transitory computer-readable medium described herein may further include operations, features, means, or instructions for transmitting, to the wireless device, the control signaling indicating a downlink channel quality threshold and a cross-link interference threshold, where receiving the random access message via the first random access occasion may be based on transmitting the control signaling indicating the downlink channel quality threshold and the cross-link interference threshold.

Some examples of the method, apparatuses, and non-transitory computer-readable medium described herein may further include operations, features, means, or instructions for transmitting, to the wireless device, the control signaling indicating a joint threshold associated with downlink channel quality and cross-link interference, where receiving the random access message via the first random access occasion may be based on transmitting the control signaling indicating the joint threshold.

Some examples of the method, apparatuses, and non-transitory computer-readable medium described herein may further include operations, features, means, or instructions for transmitting, to the wireless device, power control configuration information including at least one of a first step-size for reducing transmit power, a second step-size for increasing transmit power, a threshold measurement value for a second set of multiple measurements based on which the wireless device may be instructed to adjust its transmit power, a threshold transmit power, or any combination thereof.

Some examples of the method, apparatuses, and non-transitory computer-readable medium described herein may further include operations, features, means, or instructions for receiving a retransmission of the random access message at a transmit power that exceeds the threshold transmit power by the second step-size based on a cross-link interference threshold being satisfied.

Some examples of the method, apparatuses, and non-transitory computer-readable medium described herein may further include operations, features, means, or instructions for receiving the random access message at a transmit power that may be reduced by the first step-size for reducing transmit power.

In some examples of the method, apparatuses, and non-transitory computer-readable medium described herein, receiving the random access message may include operations, features, means, or instructions for receiving the random access message during an initial access procedure.

In some examples of the method, apparatuses, and non-transitory computer-readable medium described herein, receiving the random access message may include operations, features, means, or instructions for receiving the random access message during a beam failure recovery procedure.

In some examples of the method, apparatuses, and non-transitory computer-readable medium described herein, transmitting the control signaling may include operations, features, means, or instructions for transmitting the control signaling including an indication of a periodicity and a repetition count for the set of multiple interference measurement occasions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
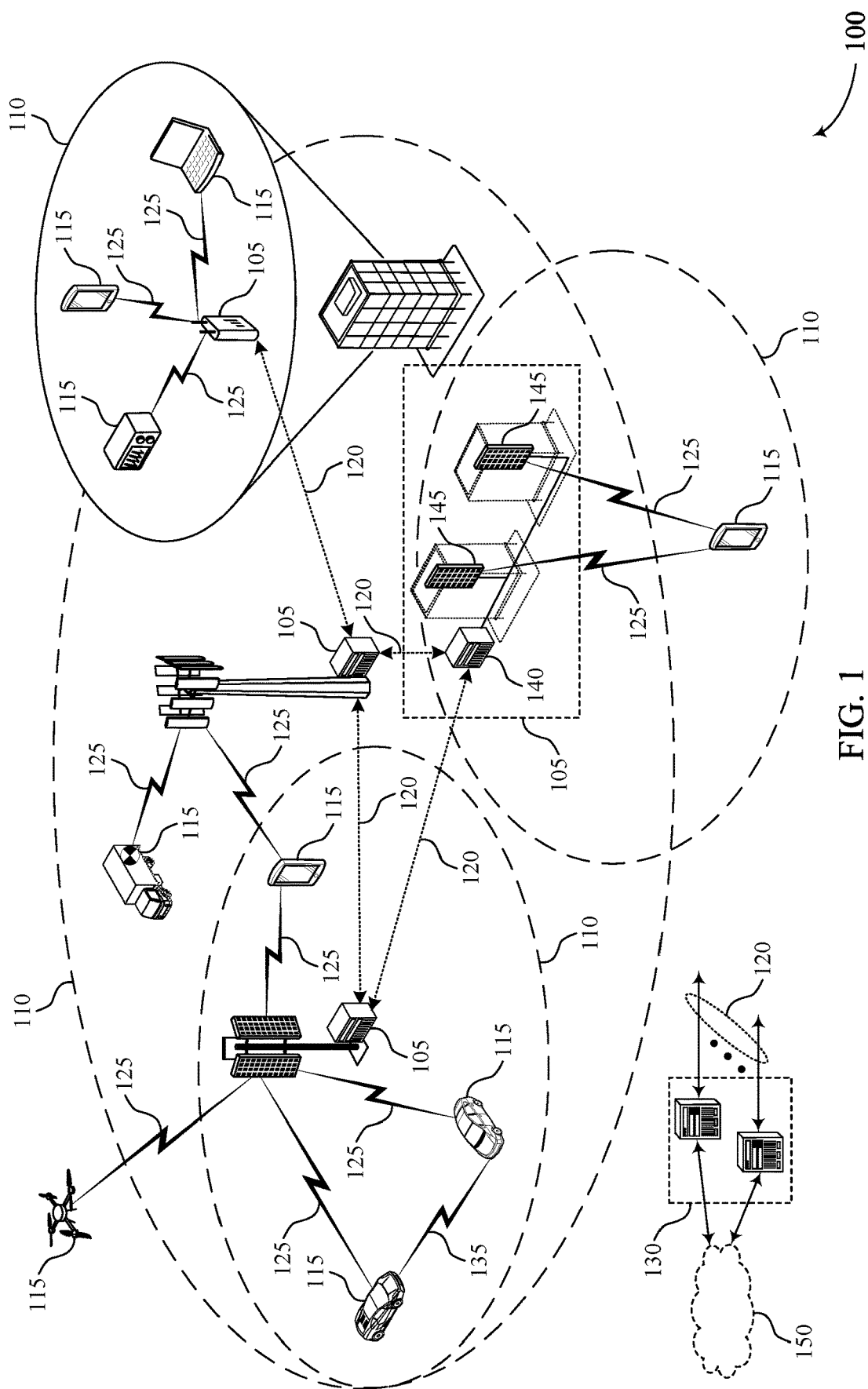
FIG. 1 illustrates an example of a wireless communications system that supports random access configuration associated with cross-link interference in accordance with aspects of the present disclosure.

Some wireless communications systems may support one or more communications modes. For example, user equipments (UEs), base stations, and the like, may support full duplex communication modes. For instance, a wireless device (e.g., such as a mobile termination (MT) functionality of an integrated and backhaul (IAB) node, a UE, or the like) operating in a full duplex mode may simultaneously communicate with one or more base stations on an uplink and a downlink. Similarly, a base station operating in a full duplex mode may simultaneously transmit downlink communications to a first set of one or more wireless device, and receive uplink communications from one or more wireless devices. In connected mode, a wireless device may perform random access procedures, and may select random access resources in one or more random access channel (RACH) occasions (ROs) for transmitting random access messages. For instance, the wireless device may receive one or more downlink reference signals (e.g., synchronization signal blocks (SSBs), and may select an RO and corresponding beam on which to transmit a RACH message based on the performed measurements.

In some examples, RACH occasions may be multiplexed with other transmissions at a wireless device (e.g., ROs may be frequency division multiplexed (FDM) with downlink communications or spatial division multiplexed (SDM) with downlink communications at a wireless device), or may overlap in time with communications by another wireless device. In such examples, self-interference for a wireless device in full duplex mode may affect the overlapping downlink transmissions, or cross-link interference (CLI) created by a wireless device in half duplex mode may affect overlapping downlink transmissions to a neighboring wireless device, or the like. For example, a wireless device transmitting a random access message in full duplex mode during a full duplex RO may generate CLI that will be experienced by another wireless device (e.g., that is receiving in half duplex of full duplex mode while the first wireless device is transmitting). In such examples, if a wireless device transmits a random access message (e.g., a RACH preamble) to a base station that is operating in FD mode (e.g., simultaneously transmitting downlink communications to another wireless device), then the transmitting wireless device may generate CLI for the receiving wireless device.

A wireless device may select ROs based jointly on downlink channel quality measurements and CLI measurements. For example, the base station may configure the wireless device with a set of SSB occasions during which to measure SSBs transmitted by the base station, and a set of interference measurement occasions (e.g., SRSresources) on which to measure CLI caused by other wireless device s. The wireless device may perform measurements on the received SSBs to determine channel quality for communications with the base station. The wireless device may also perform CLI measurements during the interference measurement occasions, and may determine whether CLI exceeds a threshold (e.g., which may be configured by the base station). The wireless device may then select a beam and an associated RO on which to transmit the random access message using the selected beam (e.g., to establish a connection or to perform a beam failure recovery procedure). The wireless device may also use the downlink channel quality measurements and CLI measurements to select between a full duplex RO and a half duplex RO. For example, if the measured CLI exceeds the configured CLI threshold, then the wireless device may transmit the random access message on a half-duplex RO (e.g., thus avoiding causing CLI to another wireless device by using a full duplex RO). If the measured CLI is less than the configured CLI, then the wireless device may select a full duplex RO.

In some examples, the base station may configure the wireless device with transmit power configuration information, and the wireless device may perform power control for the random access message based on measured CLI. The wireless device may reduce a transmit power to cause less CLI to neighboring wireless device s based on measured CLI. For instance, the wireless device may determine whether measured CLI exceeds a threshold (e.g., by a configured step-size), and if so, the wireless device may apply a maximum transmit power to some configured value. In some examples, the wireless device may determine whether the measured CLI exceeds a threshold (e.g., by a configured step-size), and if so, the wireless device may reduce a transmit power by a configured step-size. In some examples, if the measured CLI does not exceed the threshold, then the wireless device may refrain from applying such restrictions, and may increase a transmit power for retransmission based on power ramping step size, and assuming no further limits.

In some examples, the wireless device may select an uplink beam based on downlink channel quality measurements, but may refine the selected uplink beam based on CLI measurements. The wireless device may perform CLI measurements using a set of beams that are QCL with the selected uplink beam, and may transmit the random access message using one of the set of QCL beams.

Aspects of the disclosure are initially described in the context of wireless communications systems. Aspects of the disclosure are further illustrated by and described with reference to wireless communications systems, resource configurations, and process flows. Aspects of the disclosure are further illustrated by and described with reference to apparatus diagrams, system diagrams, and flowcharts that relate to random access configuration associated with cross-link interference.

FIG. 1 illustrates an example of a wireless communications system 100 that supports random access configuration associated with cross-link interference in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving wireless device (e.g., a UE 115, an IAB node, or the like) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a wireless device and a base station 105 or a core network 130 supporting radio bearers for user plane data. At the physical layer, transport channels may be mapped to physical channels.

The wireless device and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless device may select ROs based jointly on downlink channel quality measurements and CLI measurements. For example, the base station 105 may configure the wireless device with a set of SSB occasions during which to measure SSBs transmitted by the base station 105, and a set of interference measurement occasions on which to measure CLI caused by other wireless devices. The wireless device may perform measurements on the received SSBs to determine channel quality for communications with the base station. The wireless device may also perform CLI measurements during the interference measurement occasions, and may determine whether CLI exceeds a threshold (e.g., which may be configured by the base station). The wireless device may then select a beam and an associated RO on which to transmit the random access message using the selected beam (e.g., to establish a connection or to perform a beam failure recovery procedure). The wireless device may also use the downlink channel quality measurements and CLI measurements to select between a full duplex RO and a half duplex RO. For example, if the measured CLI exceeds the configured CLI threshold, then the wireless device may transmit the random access message on a half-duplex RO (e.g., thus avoiding causing CLI to another wireless device by using a full duplex RO). If the measured CLI is less than the configured CLI, then the wireless device may select a full duplex RO.

In some examples, the base station 105 may configure the wireless device with transmit power configuration information, and the wireless device may perform power control for the random access message based on measured CLI. The wireless device may reduce a transmit power to cause less CLI to neighboring wireless devices based on measured CLI. For instance, the wireless device may determine whether measured CLI exceeds a threshold (e.g., by a configured step-size), and if so, the wireless device may apply a maximum transmit power to some configured value. In some examples, the wireless device may determine whether the measured CLI exceeds a threshold (e.g., by a configured step-size), and if so, the wireless device may reduce a transmit power by a configured step-size. In some examples, if the measured CLI does not exceed the threshold, then the wireless device may refrain from applying such restrictions, and may increase a transmit power for retransmission based on power ramping step size, and assuming no further limits.

In some examples, the wireless device may select an uplink beam based on downlink channel quality measurements, but may refine the selected uplink beam based on CLI measurements. The wireless device may perform CLI measurements using a set of beams that are QCL with the selected uplink beam, and may transmit the random access message using one of the set of QCL beams.

Figure 2:
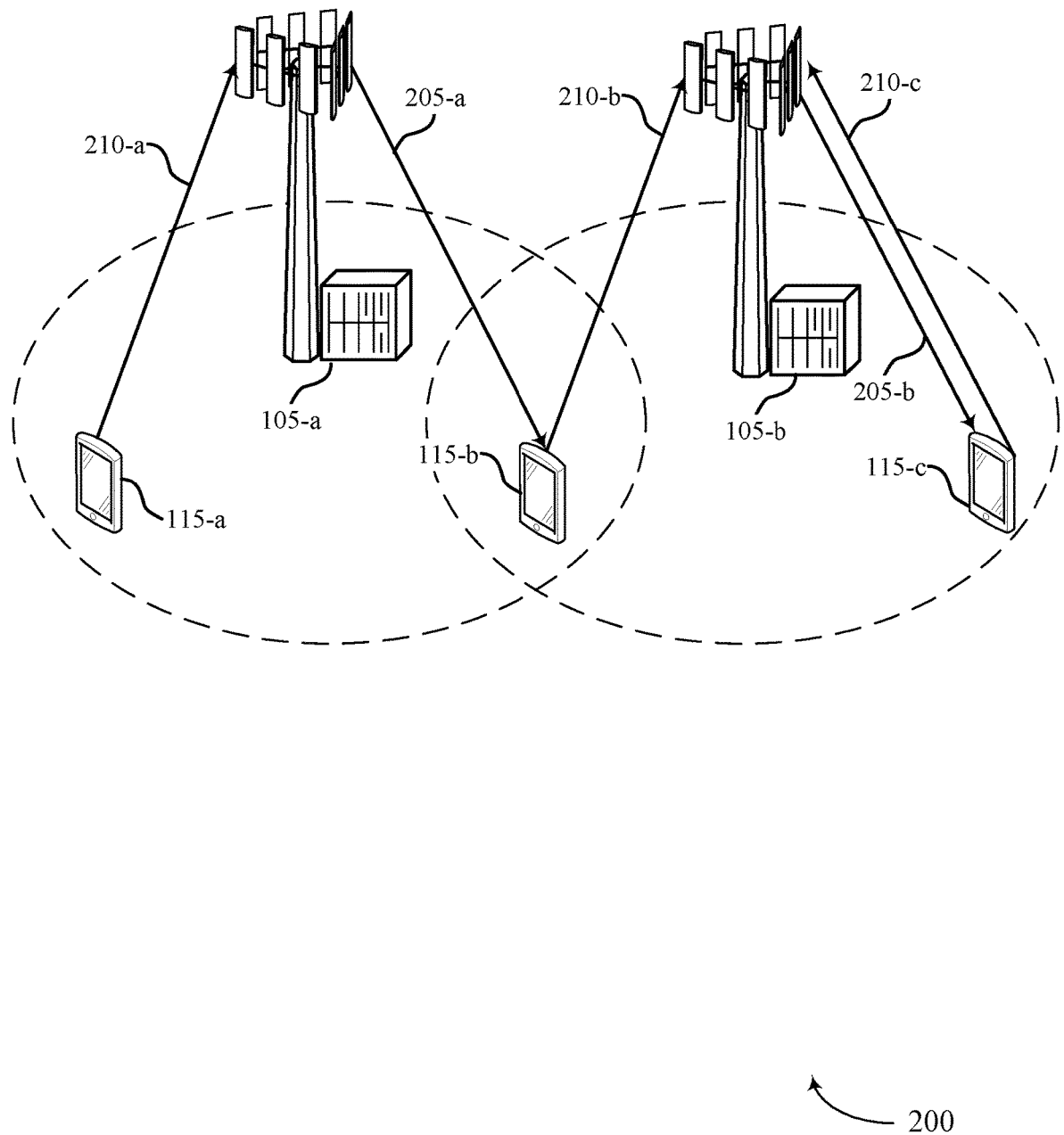
FIG. 2 illustrates an example of a wireless communications system that supports random access configuration associated with cross-link interference in accordance with aspects of the present disclosure.

FIG. 2 illustrates an example of a wireless communications system 200 that supports random access configuration associated with cross-link interference in accordance with aspects of the present disclosure. Wireless communications system 200 may include one or more base stations (e.g., base station 105-*a*, base station 105-*b*, etc.), and one or more wireless devices (e.g., UE 115-*a*, UE 115-*b*, UE 115-*c*, etc.), which may be examples of corresponding devices described with reference to FIG. 1. Although illustrated and described with reference to UEs 115, the techniques described herein may be implemented by any wireless device, such as an IAB node. Base stations 105 may be examples of IAB notes, or other devices as described with reference to FIG. 1.

In some examples, one or more wireless devices in wireless communications system 200 may support half duplex communications, full duplex communications, or both. A device in half duplex communication mode may communicate in a single direction at the same time (e.g., uplink communications or downlink communications, but not both simultaneously). A device in full duplex communication mode may simultaneously support both uplink and downlink communications. In such examples, full duplex capability may be present at a base station 105, a UE 115, or both. For instance, a UE 115 may support uplink communications on one antenna panel, while downlink reception may be supported by another antenna panel. In some examples, a base station 105 may support uplink communications at a first antenna panel and downlink communications at a second antenna panel. Full duplex capability may be conditional on beam separation, and other factors, such as self-interference between downlink and uplink, clutter echo, or the like.

For example, a UE 115-*b* may communicate in full duplex mode (e.g., with a base station 105-*a* and a base station 105-*b*). In such examples, the UE 115-*b* may receive downlink communications 205-*a* from the base station 105-*a*, and may simultaneously transmit uplink communications 210-*b* to the base station 105-*b*. In such examples, flexible TDD communications may be disabled at one or more of base station 105-*a* and base station 105-*b*, and flexible TDD communications may be enabled at UE 115-*b* (e.g., for mTRPs). In some examples, a base station 105 may operate in a full duplex mode. For example, the base station 105-*b* may simultaneously receive uplink communications 210-*b* from the UE 115-*b* and may transmit downlink communications 205-*b* to the UE 115-*c*. In such examples, flexible TDD communications may be enabled at base station 105-*b*, and flexible TDD communications may be disabled at one or both of UE 115-*b* and UE 115-*c*. In some examples, a UE and a base station may both communicate in full duplex mode. For example, the base station 105-*b* and the UE 115-*c* may both operate in full duplex mode. The base station 105-*b* may support simultaneous downlink communications 205-*b* and uplink communications 210-*c*. Similarly, the UE 115-*c* may support simultaneous uplink communications 210-*c* and downlink communications 205-*b*. In such examples, flexible TDD may be enabled at the base station 105-*b* and at the UE 115-*c*.

Full duplex operations may allow for simultaneous uplink and downlink transmissions in various frequency ranges (e.g., FR2), as part of one or more communication procedures. Wireless devices may utilize full duplex procedures as part of IAB networks.

Full duplex operations may provide one or more benefits to wireless devices in wireless communications system 200. For example, full duplex operations may result in latency reduction. If the UE 115-*b* or the UE 115-*c* receives downlink signals during uplink slots, latency may be reduced, resulting in more efficient communications and improved user experience. In some examples, full duplex operations may result in spectrum efficiency enhancements (e.g., on a per cell basis, a per device basis, a per UE basis, or the like). Additionally, or alternatively, full duplex operations may result in more efficient resource utilization.

In some examples, full duplex operations may result in increased interference. For example, if the UE 115-*b* is operating in full duplex mode, the UE 115-*b* may be receiving downlink communications 205-*a* while simultaneously transmitting uplink communications 210-*b*. The UE 115-*b* may generate self-interference (e.g., uplink communications 210-*b* may interfere with downlink communications 205-*a*). That is, while monitoring for downlink communications 205-*a* from the base station 105-*a*, the UE 115-*b* may transmit uplink communications 210-*b* to the base station 105-*b*. In such examples, the UE 115-*b* may also sense uplink communications 210-*b* transmitted by the UE 115-*b* while attempting to receive downlink communications 205-*a* (e.g., self-interference). Any UE 115 operating in full duplex mode (e.g., the UE 115-*c*) may similarly generate some level of self-interference. In some examples, self-interference may be mitigated or may be less than a threshold amount, which may not have a substantial impact on communications. However, in some examples, self-interference may result in one or more failed transmissions, one or more retransmissions, or the like. In some examples, even such impacts may disrupt communications (e.g., may not satisfy requirements for high priority communications such as ultra-reliable low latency communications (URLLC)).

In some cases, a UE 115 (e.g., operating in half duplex mode or full duplex mode) may generate cross-link interference when a base station is operating in full duplex mode. For example, the base station 105-*a* may operate in full duplex mode. The base station 105-*a* may simultaneously receive uplink communications 210-*a* and transmit downlink communications 205-*a*. In some examples, uplink communication 210-*a* may interfere with downlink communications 205-*a*. That is, while the UE 115-*b* monitors for downlink communications 205-*a*, the UE 115-*b* may also sense uplink communications 210-*a*, which may result in one or more failed transmissions, retransmissions, system delays, increased latency, etc. Even in cases where such impacts are mitigated or reduced, even small amounts of interference or relatively rare failed transmissions may have a significant negative impact on wireless communications system 200 (e.g., in the case of interference with high priority signaling such as URLLC).

In some examples, as described in greater detail with reference to FIG. 3, a base station 105 may configure a UE 115 with one or more random-access channel (RACH) occasions (ROs), for transmitting RACH messages. In some examples, one or more ROs may be associated with a synchronization signal block (SSB). A UE 115 may select an RO for transmitting the RACH messages (e.g., based on performing channel measurements on received SSBs, and selecting a preferred beam and SSB associated with the RO). Each RO may be defined by time resources, frequency resources, spatial resources, or any combination thereof. A UE 115 may receive SSBs from the base station 105 via one or more SSB occasions (e.g., time resources, frequency resources spatial resources, or any combination thereof, designated for receiving SSBs). The UE 115 may perform one or more channel measurements on reference signals received on the SSBs (e.g., reference signal receive power (RSRP), or the like). The UE 115 may determine a preferred SSB based on the one or more measurements. An SSB may be configured (e.g., via higher layer signaling) to correlate to a preferred beam (e.g., a downlink beam on which a preferred SSB was received). The UE 115 may select an RO from a set of available ROs that correlates to the preferred SSB, and may transmit a random access message to the base station 105 on the selected RO using a corresponding beam (e.g., an uplink beam corresponding to the downlink beam on which the preferred SSB was received).

UEs 115 may utilize the ROs for transmitting random-access messages during various random access procedures (e.g., to establish a connection in a disconnected mode, as part of a handover, beam refinement procedure, beam selection procedure, or other beam management procedure in connected mode, or the like). In some examples, a UE 115 may transmit uplink communications 210 that include random access messages on one or more ROs. However, such uplink communications may result in cross-link interference of the receiving base station 105 is operating in full duplex mode, as described in greater detail with reference to FIG. 3.

In some examples, as described herein, a base station 105 may configure one or more ROs, one or more SSB occasions, and one or more interference measurement occasions (e.g., SRS resources on which to measure CLI caused by other UEs 115). The UE 115 may measure both channel quality via the SSB occasions but may also measure CLI via the interference measurement occasions. Having done so, the UE 115 may select an RO (e.g., a half-duplex RO or a full duplex RO) for transmitting a random access message based on both downlink channel quality measurements and CLI measurements, as described in greater detail with reference to FIGS. 3-5.

Figure 3:
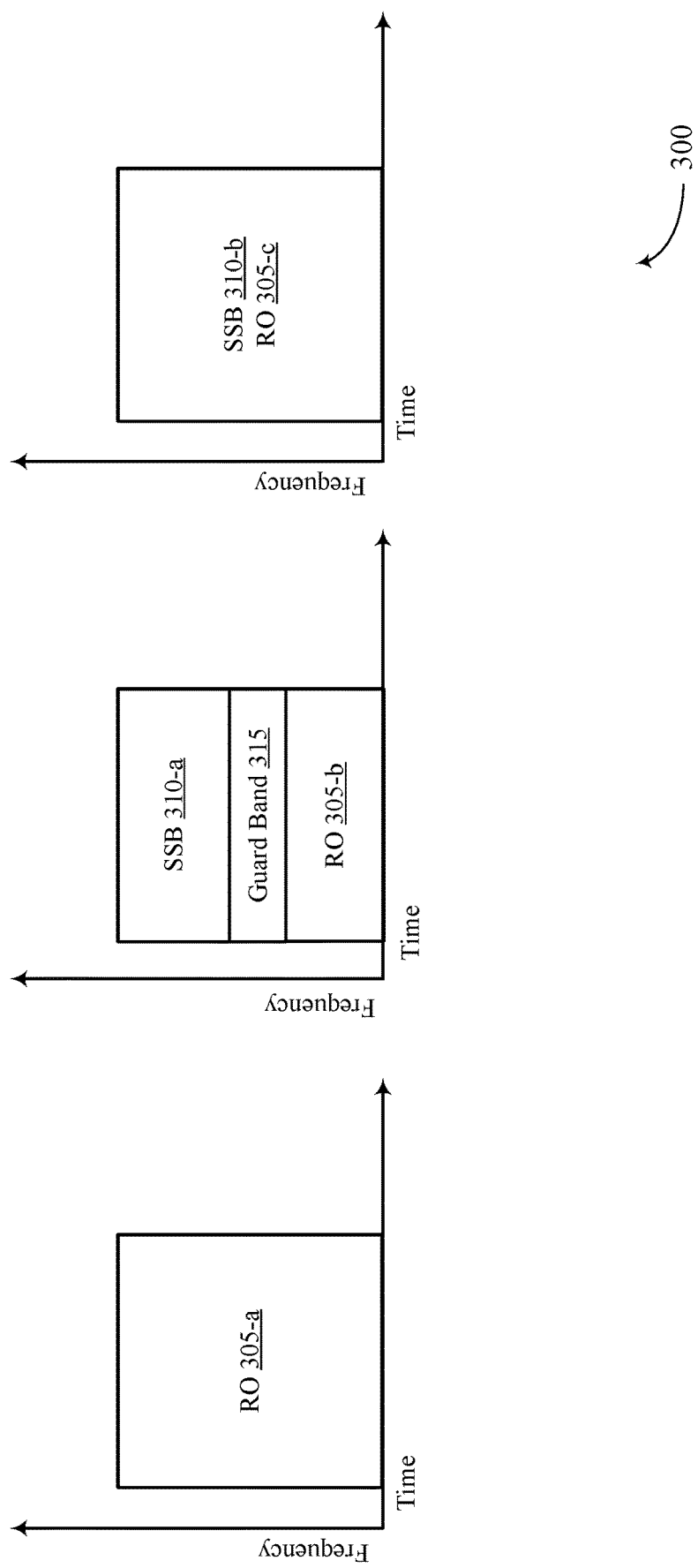
FIG. 3 illustrates an example of a resource configuration that supports random access configuration associated with cross-link interference in accordance with aspects of the present disclosure.

FIG. 3 illustrates an example of a resource configuration 300 that supports random access configuration associated with cross-link interference in accordance with aspects of the present disclosure. In some examples, resource configuration 300 may be configured by or implemented by one or more wireless devices, such as base stations and wireless devices(e.g., such as UEs. IABs, or the like), which may be examples of corresponding devices described with reference to FIGS. 1-2. Although described with reference to a UE 115, techniques described herein may also be implemented by any other wireless device, such as an IAB node.

In some examples, a wireless device (e.g., a UE 115) may operate in half duplex mode. For instance, as described with reference to FIG. 2, a UE 115-*a* may operate in half duplex mode. In such examples, the UE 115-*a* may perform uplink or downlink communication at any given time (e.g., but may not simultaneously perform uplink and downlink communications). In such examples, a base station (e.g., the base station 105-*a*) may configure one or more ROs 305-*a*. ROs 305-*a* may be TDMed with downlink communications. For example, RO 305-*a* may not overlap in time with downlink communications including SSBs, PDCCHs, PDSCHs, CSI-RSs, or the like.). RO 305-*a* may be referred to as a TDMed half duplex (HD) RO. In such examples, a UE 115 may experience long access delays. To decrease access delays, a UE 115 may operate in full duplex mode (e.g., instead of in half duplex mode). In such examples, ROs 305 may be permitted to overlap in time with one or more downlink transmissions.

Downlink transmissions (e.g., SSBs 310, PDCCHs, PDSCHs, CSI-RSs, or the like) may overlap with ROs 305 (e.g., if a UE 115 is operating in full duplex mode). In some examples, downlink transmissions (e.g., SSB 310-*a*) may be FDMed with ROs 305 (e.g., RO 305-*b*), and RO 305-*b* may be referred to as a FDMed full duplex (FD) RO. Such overlap in time may improve system efficiency and support lower latency. Thus, RO 305-*b* and SSB 310-*a* may overlap at least partially in time (e.g., may share one or more time resources), but may be span different or partially different frequency resources (e.g., may be separated by a guard band 315).

Downlink transmissions (e.g., SSBs 310, PDCCHs, PDSCHs, CSI-RSs, or the like), may overlap with ROs 305 in time. In some examples, downlink transmissions (e.g., SSB 310-*b*) may be SDMed with RO 305-*c*, and RO 305-*c* may be referred to as a SDMed full duplex (FD) RO In such examples, the downlink transmission (e.g., SSB 310-*b*) may share the same or partially overlapping time resources and frequency resources.

In cases where downlink transmissions overlap at least partially in time with ROs 305 (e.g., via FDM or SDM transmission configurations) for a UE 115, uplink transmissions of random access messages on the ROs 305 may result in interference (e.g., self-interference for the transmitting UE 115 or cross-link interference for a base station 105 operating in full duplex mode). Even if the UE 115 configured with the ROs 305 is operating in a half-duplex mode, a RACH message transmitted on the ROs 305 may result in cross-link interference for another UE 115, or self-interference at a base station operating in full duplex mode, or the like. Thus, in any case where an RO 305 is schedule, random access messages transmitted on one or more scheduled ROs 305 may result in some level of interference.

In some examples, the base station 105 may configure multiple ROs 305. Different ROs 305 may be associated with different communication modes. For instance, some ROs may be referred to as full duplex ROs (e.g., ROs during which the base station is operating in full duplex mode), and other ROs may be referred to as half duplex ROs (e.g., ROs during which the base station is operating in half duplex mode). If transmission of a random access message will cause CLI to another UE during a full duplex RO, then a UE may instead transmit a random access message using a half-duplex mode, as described in greater detail with reference to FIGS. 4-5. In some examples, as described in greater detail with reference to FIGS. 4-5, a UE may select a beam and corresponding RO for transmitting a random access message based on both channel quality measurements (e.g., SSB measurements) and CLI interference measurements (e.g., interference measurements performed during interference measurement occasions).

Figure 4:
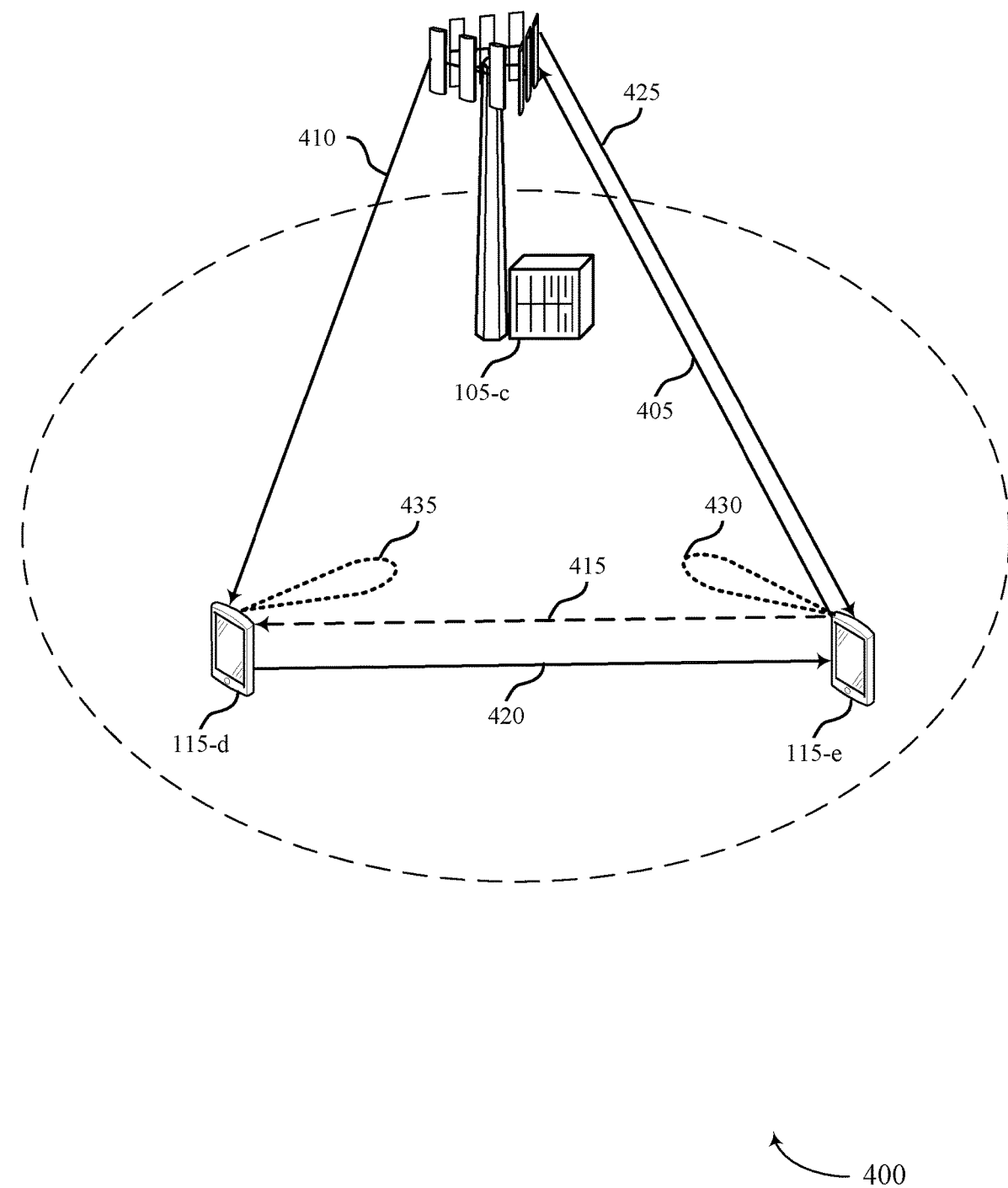
FIG. 4 illustrates an example of a wireless communications system that supports random access configuration associated with cross-link interference in accordance with aspects of the present disclosure.

FIG. 4 illustrates an example of a wireless communications system 400 that supports random access configuration associated with cross-link interference in accordance with aspects of the present disclosure. Wireless communications system 400 may include a base station 105-*c*, and one or more wireless devices (e.g., a UE 115-*d* and a UE 115-*e*), which may be examples of corresponding devices (e.g., UEs 115 and base station 105) described with reference to FIGS. 1-3. Although illustrated and described with reference to UEs 115, techniques described with reference to FIG. 4 may be implemented by any wireless device (e.g., an IAB node).

In some examples, transmission of a random access message (e.g., a random access preamble) by a UE 115 may cause CLI to another UE 115. For example, UE 115-*e* may transmit a random access message 405 on uplink to the base station 105-*c*. However, if the base station 105-*c* is operating in a full duplex mode, then the UE 115-*d* may be monitoring a downlink to receive a downlink message 410 at the same time the UE 115-*e* is transmitting the random access message 405. In such examples, the UE 115-*d* may sense CLI 415 generated by the UE 115-*e*. That is, the UE 115-*d* may be attempting to receive the downlink message 410, but may instead sense the transmitted random access message 405 (e.g., CLI 415). The CLI 415 may interfere with the downlink message 410.

To avoid, or mitigate, CLI, the base station 105-*c* may configure served UEs 115 (e.g., neighbor UEs, such as the UE 115-*d* and the UE 115-*e*) with one or more interference measurement occasions (e.g., SRS occasions). The base station 105-*c* may configure the UEs 115 to transmit one or more reference signals (e.g., SRSs 420) during interference measurement occasions (e.g., SRSs transmitted periodically, at the same symbol, or the like). In some examples, the base station 105-*c* may configure the UEs 115 to transmit reference signals (e.g., SRSs 420) using the same SRS sequence. The base station 105-*c* may broadcast information (e.g., via RMSI) indicating the location (e.g., time resources, frequency resources, spatial resources, or the like) of the SRS occasions. UEs 115 (e.g., when performing initial access procedures, beam recovery procedures, or the like) may monitor and detect reference signals (e.g., SRSs on the SRS occasions). In some examples, an initial access UE 115 (e.g., the UE 115-*e*) may monitor the SRS resources to measure CLI. The initial access UE 115 may determine whether a full duplex preamble transmission will affect downlink transmissions. The UE 115-*e* may not select a full duplex RO for preamble transmissions (e.g., if doing so would cause CLI to another UE). For example, if the UE 115-*e* does not detect any SRS signal, a full duplex preamble may not affect a prioritized downlink transmission. Thus, by receiving SRSs and measuring CLI, the UE 115-*e* may determine whether a full duplex preamble will affect a neighbor UE 115-*d* receiving downlink signaling (e.g., that has a higher priority than random access message transmissions sent by the UE 115-*e*).

In some examples, a UE 115-*e* may determine whether transmissions will cause CLI based at least in part on CLI measurements performed by the UE 115-*e*. For instance, the UE 115-*d* may be configured to transmit reference signals (e.g., SRSs 420) during one or more interference measurement occasions (e.g., SRS occasions). The UE 115-*e* may measure CLI detected during the SRS occasion (e.g., may measure RSSI of the CLI, or may detect CLI by measuring SRS RSRP during the SRS occasion, or the like). The UE 115-*e* may determine that if transmissions by the UE 115-*d* cause interference to the UE 115-*e*, then transmissions by the UE 115-*d* (e.g., during a full duplex resource) may cause similar interference (e.g., CLI 415) to the UE 115-*d*. Thus, if the UE 115-*e* detects CLI (e.g., above a threshold, as described herein) during the interference measurement occasions, then the UE 115-*e* may determine that transmission of a random access message during a full duplex RO may cause interference to the UE 115-*d*.

In some examples, a UE 115-*e* may select an SSB and associated RO (e.g., based on SSB RSRP measurements configured in RMSI), and then selects between associated full duplex ROs and half duplex ROs based on CLI measurements. However, in such cases, the beam used for uplink and downlink communications with the base station 105-*c* may be based solely on the SSB measurements (e.g., without regard to the CLI measurements). If the UE 115-*e* selects a beam (e.g., beam 430) for transmitting random access messages 405 to the base station 105-*c* without regard to potential CLI, then random access procedures may result in increased interference, failed wireless communications, increased delays and system latency, and inefficient use of available system resources.

In some examples, the UE 115-*e* may perform RO and beam selection based jointly on SSB measurements (e.g., an SSB-RSRP) and CLI measurements (e.g., a CLI-RSSI, an SRS-RSRP, or the like). In such examples, the UE 115-*e* may select a beam, associated ROs, and sub-selection of half duplex or full duplex ROs, on which to send a random access message 405 based on both an uplink downlink channel quality (e.g., measured via received SSBs 425) and potential CLI (e.g., measured via reference signals such as SRSs 420) to other UEs. For instance, the UE 115-*e* may use a set of beams to receive a set of SSBs 425 (e.g., as configured by the base station 105-*c*). The UE 115-*e* may select a subset of the beams (e.g., for SSB measurements that satisfy an SSB threshold), and may use the selected beam or beams to receive one or more reference signals (e.g., SRSs 420) during configured interference measurement occasions (e.g., SRS resources). The UE may determine both a channel quality (e.g., based on the SSBs 425) and a CLI (e.g., based on the SRSs 420) for the same beam (e.g., beam 430), and may select a full duplex or half duplex RO associated with that beam based on the determined channel quality and CLI. For example, the UE 115-*e* may determine that if the UE 115-*e* can sense transmissions by a neighbor UE 115-*d* (e.g., on a particular beam), then the UE 115-*d* may be able to sense transmissions made by the UE 115-*e* (e.g., on the same particular beam). Thus, if a channel quality satisfies a threshold, but measured CLI fails to satisfy a CLI threshold (e.g., the UE 115-*e* senses SRSs transmitted by neighbor UEs), then the UE 115-*e* may determine that uplink transmission of a random access message on a full duplex resources (e.g., during which the base station 105-*c* is simultaneously transmitting downlink signaling to the UE 115-*d*), then the UE 115-*e* may select a half duplex resource on which to transmit the random access message on the selected beam 430. However, if detected CLI satisfies the CLI threshold (e.g., the UE 115-*e* cannot sense SRSs transmitted by the UE 115-*d* above the CLI threshold), then the UE 115-*e* may determine that uplink transmissions during full duplex ROs will not cause CLI to the UE 115-*d*. Thus, the UE 115-*e* may select a full duplex RO on which to transmit the random access message.

In some examples, the base station 105-*c* may configure the UE 115-*e* with multiple (e.g., separate) thresholds for measuring uplink/downlink channel quality, and potential CLI, respectively. For instance, the base station may configure the UE 115-*e* with a first threshold (e.g., SSB_TH) and a second threshold (e.g., CLI_TH). The UE 115-*e* may receive SSBs 425 during SSB occasions, and may perform one or more channel quality measurements (e.g., RSSI, RSRP, or the like). The UE 115-*e* may also receive one or more reference signals (e.g., SRSs 420) during interference measurement occasions such as SRS occasions (e.g., transmitted by the UE 115-*d* via the beam 435), and may perform one or more CLI measurements (e.g., CLI RSSI, SRS RSRP, or the like). The UE may determine whether the channel quality measurements satisfy the first threshold (e.g., whether SSB RSRP>SSB_TH) on beam 430, and may also determine whether the CLI measurements satisfy the second threshold (e.g., whether CLI<CLI_TH) on beam 430. If such is the case (e.g., both SSB RSRP>SSB_TH and CLI<CLI_TH), then the UE 115-*e* may select the beam (e.g., beam 430) corresponding to the results of the measurements and an associated full duplex RO. That is, if the SSB is above the SSB_TH, and the CLI is below the CLI_TH, then the UE 115-*e* may determine that transmission using the beam 430 will not result in CLI 415 for the UE 115-*d*, and may transmit the random access message 405 on the full duplex RO associated with the selected beam. That is, if the CLI is below the CLI_TH, the UE 115-*d* may determine that another transmitting UE 115-*d* is not generating interference, and that the UE 115-*e* would not generate interference for the other UE 115-*d* during a full duplex RO. Thus, the UE 115-*e* may select a full duplex RO associated with the selected beam. However, for any detected SSBs 425 with an SSB RSRP>SSB_TH and a CLI>CLI_TH, the UE 115-*e* may select an SSB with SSB RSRP>SSB_TH and an associated half duplex RO on which to transmit the random access message 405. That is, if SSB measurements performed using a particular beam 430 satisfies the SSB threshold, but CLI measurements performed using the same beam 430 do not satisfy the CLI threshold, then the UE 115-*e* may select a half-duplex RO for transmitting the random access message 405 on the beam 430. For instance, the UE 115-*e* may determine that, if the UE 115-*e* can sense reference signals (e.g., SRSs) transmitted by the UE 115-*d* on the beam 430, then the UE 115-*d* may sense random access signaling transmitted by the UE 115-*e* to the base station 105-*c* during a full duplex RO. Thus, to avoid generating such interference, the UE 115-*e* may select a half duplex RO associated with the selected beam 430.

In some examples, the base station 105-*c* may configure the UE 115-*e* with a single joint threshold for measuring uplink/downlink channel quality and potential CLI. The joint metric may be a signal to interference ratio (SIR). For instance, the SIR may be defined as a SSB RSRP—CLI RSSI, or SSB RSRP—SRS RSRP. The UE may subtract detected measurements (e.g., CLI RSSI) from channel quality measurements (e.g., SSB RSRP), and may determine whether the resulting value satisfies the joint threshold. The base station 105-c may configure the joint metric and a joint threshold with which to select a full duplex RO or half duplex RO for a particular beam (e.g., beam 430). For instance, the UE 115-e may perform measurements on the SSBs 425 and the SRSs 420, and may determine the joint metric (e.g., calculate the SIR). The UE 115-e may compare the calculated SIR to the configured joint threshold. If the joint metric satisfies the joint threshold (e.g., uplink/downlink channel quality is good enough and CLI is low enough to satisfy the joint metric), then the UE 115-e may select a full duplex RO associated with the beam on which the measurements were performed (e.g., beam 430). If the joint metric does not satisfy the joint threshold (e.g., for the beam 430), then the UE 115-e may select a half-duplex RO associated with the beam on which the measurements were performed.

In some examples, a UE 115-e may perform power control based at least in part on measured CLI. For example, the UE 115-e may perform CLI measurements on reference signals (e.g., SRSs 420) received from the UE 115-d via the interference measurement occasions (e.g., SRS occasions configured by the base station 105-c). The UE 115-e may select a full duplex RO and beam on which to transmit the random access message 405 (e.g., on beam 430). Having selected a full duplex RO, the UE 115-e may adjust a transmit power (e.g., for transmitting the random access message 405) based on the measured CLI. For instance, the UE 115-e may reduce a transmit power when transmitting the random access message 405 (e.g., on beam 430) to cause less CLI 415 to neighboring UEs 115-d.

In some examples, the base station 105-c may configure one or more UEs 115 (e.g., the UE 115-e) with transmit power configuration information. The information may include, for instance, a CLI threshold (e.g., a baseline value to which measurement values may be applied to determine whether to cap transmit power or not), a transmit power reduction step-size, a transmit power augmentation step-size, a cap or maximum transmit power, or any combination thereof. The UE 115-e may determine whether CLI measurements (e.g., CLI RSSI, SRS RSRP, or the like) satisfy (e.g., exceed) the CLI threshold. For instance, the UE 115-e may determine that the CLI exceeds the CLI threshold (e.g., that a measured CLI exceeds the CLI threshold by a number of dB Y, such that CLI=CLI threshold+Ydb). In such examples, the UE 115-e may apply the cap indicated in the transmit power configuration information (e.g., may refrain from transmitting the random access message 405 on a full duplex RO at a transmit power that exceeds the cap). In some examples, the UE 115-e may determine that the CLI exceeds the CLI threshold (e.g., that a measured CLI exceeds the CLI threshold by a number of dB Y, such that CLI=CLI threshold+Ydb), and may reduce a transmit power by a configured step-size (e.g., g(y) dB, where g(y) may represent a function or portion of the number of dB Y by which measured CLI exceeds the CLI threshold). In such examples, the UE 115-e may transmit the random access message 405 on a full duplex RO at a transmit power that is reduced (e.g., from a default transmit power or a maximum transmit power) by the step-size (e.g., g(y) dB) indicated in the transmit power configuration information.

In some examples, the UE 115-e may perform transmit power ramping. The UE 115-e may determine whether to implement one or more rules (e.g., the cap, a transmit power reduction, or the like). For example, if a random access retransmission is to occur on a half-duplex RO, or on a full duplex RO where an updated measured CLI is less than a CLI threshold, then the UE may refrain from applying any restrictions (e.g., a cap or a transmit power reduction, or the like) during retransmission. In such examples, the UE 115-e may increase a transmit power across a set of retransmissions (e.g., without regard to the cap, or without reducing a transmit power). In such examples, the UE 115-e may assume no additional limits to transmit power. However, during retransmissions, the UE 115-e may implement one or more limits for full duplex ROs when a CLI measurement (e.g., on a particular beam 430) exceeds a CLI threshold. In such examples, the UE 115-e may increase a transmit power across retransmissions up to a cap indicated in the transmit power configuration information, or may reduce a transmit power according to the transmit power reduction step-size, or the like. The UE 115-a may perform power control techniques as described here in combination with joint CLI and uplink/downlink channel measurements and RO selection, or independent from such measurements and RO selection. In some examples, if the random access retransmission is on a half duplex RO or on a full duplex RO (e.g., where the updated measured CLI is less than the CLI threshold), then the UE 115 may not apply the restrictions described herein (e.g., a cap to transmit power, a transmit power reduction by the step-size, or the like). The UE 115 may increase its transmit power based on the configured power ramping step size, and assuming no further limitations. Indications of power threshold values, power configurations, and the like, may be indicated by the base station (e.g., via RMSI).

In some examples, the UE 115-e may select an uplink beam (e.g., beam 430) on which to transmit the random access message 405 based on SSB measurements, and may refine the beam 430 based on CLI measurements. For example, the UE 115-e may receive one or more SSBs 425 using the beam 430, may perform SSB measurements, and may select a preferred SSB and corresponding RO. The UE 115-e may then attempt to refine the beam 430. For instance, the UE 115-e may check a set of candidate beam (e.g., K candidate beams) that are spatially quasi co-located (QCLed) with the beam 430 to reduce CLI to other UEs 115. In some examples, the K candidate beams may be refined beams that at least partially overlap in space with the beam 430. The UE 115-e may use configured uplink resources for CLI measurement (e.g., interference measurement occasions such as SRS occasions) to measure CLI using the K candidate beams and select a proper beam. For example, the UE 115-e may receive a set of reference signals (e.g., SRSs 420) while beam sweeping through the set of K candidate beams. The UE 115-e may perform CLI measurements on the received reference signals, and may select a preferred beam. The preferred beam may be the beam 430, or may be one of the set of K candidate beams (e.g., depending on the results of the CLI measurements and the beam sweeping). In some examples, the base station 105-c may configure the UE 115-e and the UE 115-d with periodic uplink CLI resources (e.g., SRS resources) with repetition for use by the UE 115-e in performing beam refinement. For example, the UE 115-d may transmit an SRS 420, with repetition, as configured by the base station 105-c, and the UE 115-e may perform the beam sweeping procedure using the K candidate beams on the received repetitions of the SRSs 420.

Having refined the initially selected beam 430, the UE 115-e may re-evaluate the previously measured SSB measurements (e.g., SSB RSRP) with respect to the refined beam. In such examples, the UE 115-e may perform new measurements of new instances of SSBs 425 using the refined beam. In some examples, the UE 115-e may add an estimated offset value to previously measured SSB RSRP to determine a current uplink/downlink channel measurement for the refined beam.

The UE 115-e may perform beam and RO selection based on both SSB and CLI measurements, power control, and beam refinement, in combination. In some examples, a UE 115-e may perform any one of beam and RO selection based on both SSB and CLI measurements, power control, or beam refinement independently (e.g., may perform power control, or beam refinement, instead of joint beam and RO selection based on both SSB and CLI measurements).

Figure 5:
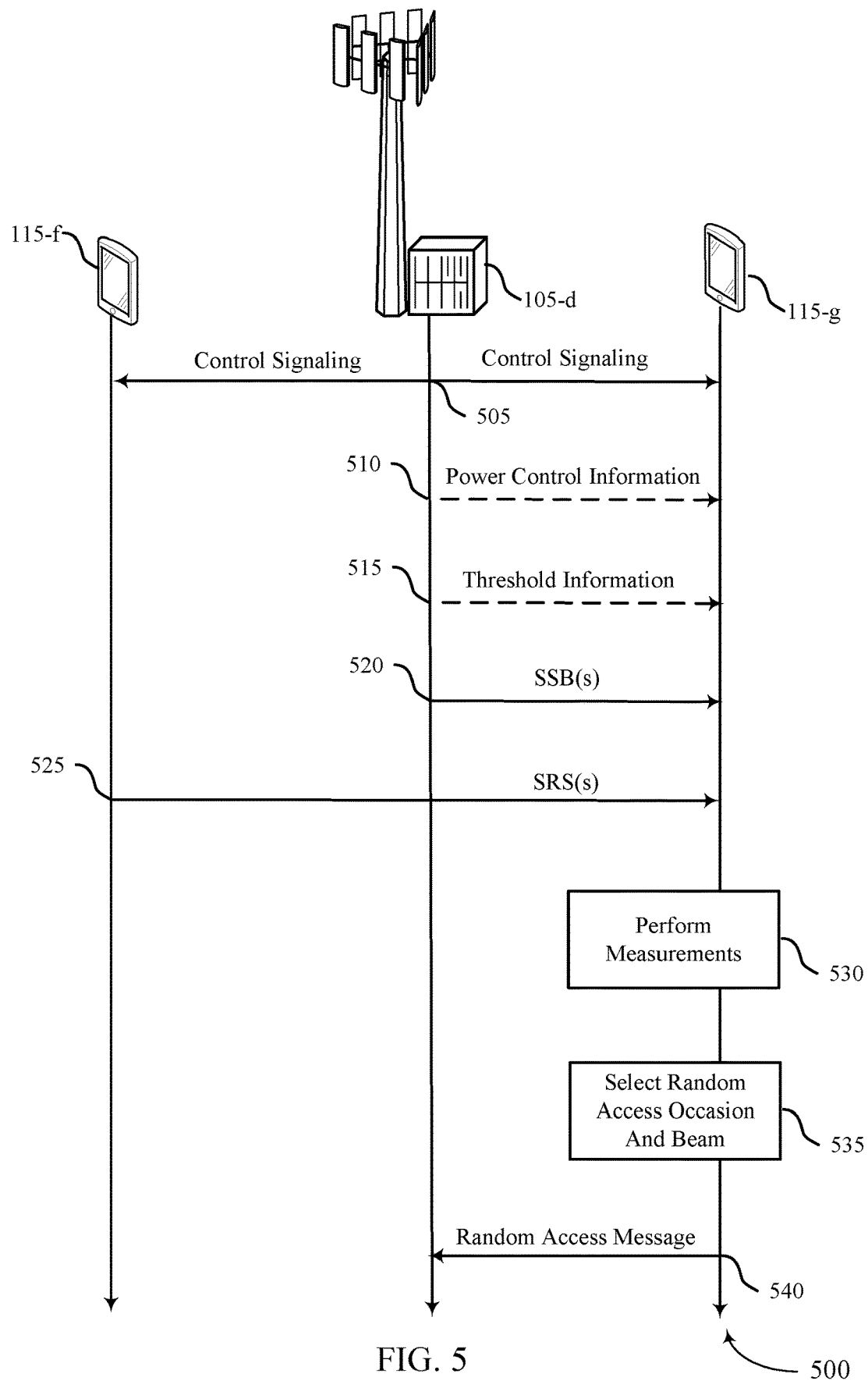
FIG. 5 illustrates an example of a process flow that supports random access configuration associated with cross-link interference in accordance with aspects of the present disclosure.

FIG. 5 illustrates an example of a process flow 500 that supports random access configuration associated with cross-link interference in accordance with aspects of the present disclosure. Process flow 500 may include a base station 105-d, and one or more wireless devices (e.g., a UE 115-f and a UE 115-g, an IAB node, or the like), which may be examples of corresponding devices described with reference to FIGS. 1-4. Although illustrated and described with reference to UEs 115, techniques described herein may be implemented by any wireless device (e.g., an IAB node).

At 505, base station 105-d may transmit, and the UE 115-f and the UE 115-g may receive, control signaling. The control signaling may indicate a set of one or more SSB occasions associated with measuring downlink reference signals (e.g., synchronization signals) and a set of one or more interference measurement occasions (e.g., SRS occasions) associated with measuring CLI.

At 520, the base station may transmit one or more SSBs during the SSB occasions configured via the control signaling at 505. The UE 115-g may monitor the SSB occasions, and may receive the SSBs based thereon at 520.

At 525, the UE 115-f may transmit, and the UE 115-g may receive, one or more reference signals during one or more interference measurement occasions (e.g., SRSs). The UE 115-f may transmit the reference signals during interference measurement occasions (e.g., SRS occasions) as configured by the base station 105-d via the control signaling at 105-d.

At 530, UE 115-g may perform one or more measurements on the downlink reference signals received via the SSB occasions at 520, and may further perform measurements of the reference signals (e.g., SRSs) received via the interference measurement occasions (e.g., SRS occasions) at 525. The UE may measure channel quality based on the measurements performed on the SSBs, and may measure CLI based on the measurements performed on the reference signals.

At 535, the UE 115-g may select a first random access occasion associated with a first beam (e.g., from a set of candidate random access occasions, each one of which is associated with a beam) based on the measurements performed at 535. That is, the UE 115-g may select a random access occasion and corresponding beam based on both measured channel quality and detected CLI.

In some examples, the UE 115-g may select the beam based on a quasi-co-location relationship between one or more candidate beams. For example, the UE 115-g may identify a first candidate beam based on the SSB measurements, and may identify one or more additional (e.g., second) candidate beams that have a quasi-co-location relationship with the first candidate beam. The UE may determine whether to utilize the initially identified (e.g., first) candidate beam, or whether to select one of the second beams that are quasi co-located with the first beam. In some examples, the UE may then perform additional measurements on SSBs received from the base station 105-d using the newly selected beam (e.g., one of the quasi co-located beams) to ensure that the newly selected beam satisfies a channel quality threshold. IN some examples, the UE may estimate a measurement offset value between the first beam and the second beam, and may apply the estimated measurement offset value to the previously performed measurements on the SBs received at 520.

At 540, the UE 115-g may transmit a random access message to the base station 105-b on the selected random access occasion using the selected beam. The UE 115-g may transmit the random access message as part of an initial access procedure, a beam failure recovery procedure, or the like. In some examples, the UE 115-g may transmit the random access message by performing beam sweeping procedure (e.g., using the multiple quasi co-located beams). In such examples, the UE 115-g may receive control signaling indicating a periodicity and a repetition count of the SSB occasions, to facilitate the beam sweeping procedure. The UE 115-g may receive such an indication via control signaling (e.g., at 505, or in separate signaling).

The selected random access occasion may be a half-duplex random access occasion or a full duplex random access occasion (e.g., based on the CLI measurements performed at 530). For instance, the UE 115-g may select a random access occasion that is a full duplex random access occasion if the SSB measurements satisfy (e.g., exceed) a downlink channel quality threshold and at least one of the SRS measurements satisfy a CLI threshold. In some examples, the UE 115-g may select a full duplex random access occasion if at least one of the SSB measurements satisfy a downlink channel quality threshold and at least one of the reference signal measurements (e.g., SRS measurements) fails to satisfy a CLI threshold.

In some examples, the base station 105-d may provide threshold information to the UE 115-g. For example, at 525, the base station 105-d may transmit, and the UE 115-g may receive, control signaling indicating a downlink channel quality threshold and a CLI threshold. In some examples, the UE 115-g may select the random access occasion and beam at 535 based on whether the SSB measurements satisfy the channel quality threshold, whether the SRS measurements satisfy the CLI threshold, or both. In some examples, the control signaling indicating the threshold information at 515 may indicate a joint threshold associated with both downlink channel quality and CLI. IN such examples, the selecting at 535 may be based on a combination of the SSB measurements and the SRS measurements, as described in greater detail with reference to FIG. 4.

The UE 115-g may perform power control for transmitting the random access message based at least in part on power control information provided by the base station 105-d. For example, at 510, the base station 105-d may transmit, and the UE 115-g may receive, power control configuration information. The power control configuration information may indicate at least one of a first step-size for reducing transmit power, a step-size for increasing transmit power, a threshold measurement value for the second plurality of measurements based on which the UE is instructed to adjust a transmit power, a threshold transmit power, or any combination thereof. In such examples, the UE 115-g may refrain from transmitting the random access message at a transmit power that exceeds a threshold transmit power. In some examples, the UE 115-*g* may send one or more retransmissions of the random access message at 540 at a transmit power that exceeds the threshold transmit power (e.g., may increment the transmit power for one or more retransmissions by the second step-size even if the resulting transmit power exceeds the threshold transmit power) if the CLI measurements fail to satisfy a CLI threshold (e.g., are not higher than the threshold). In some examples, the UE 115-*g* may reduce the transmit power by the first step-size if the measured CLI fails to satisfy a CLI threshold.

Figure 6:
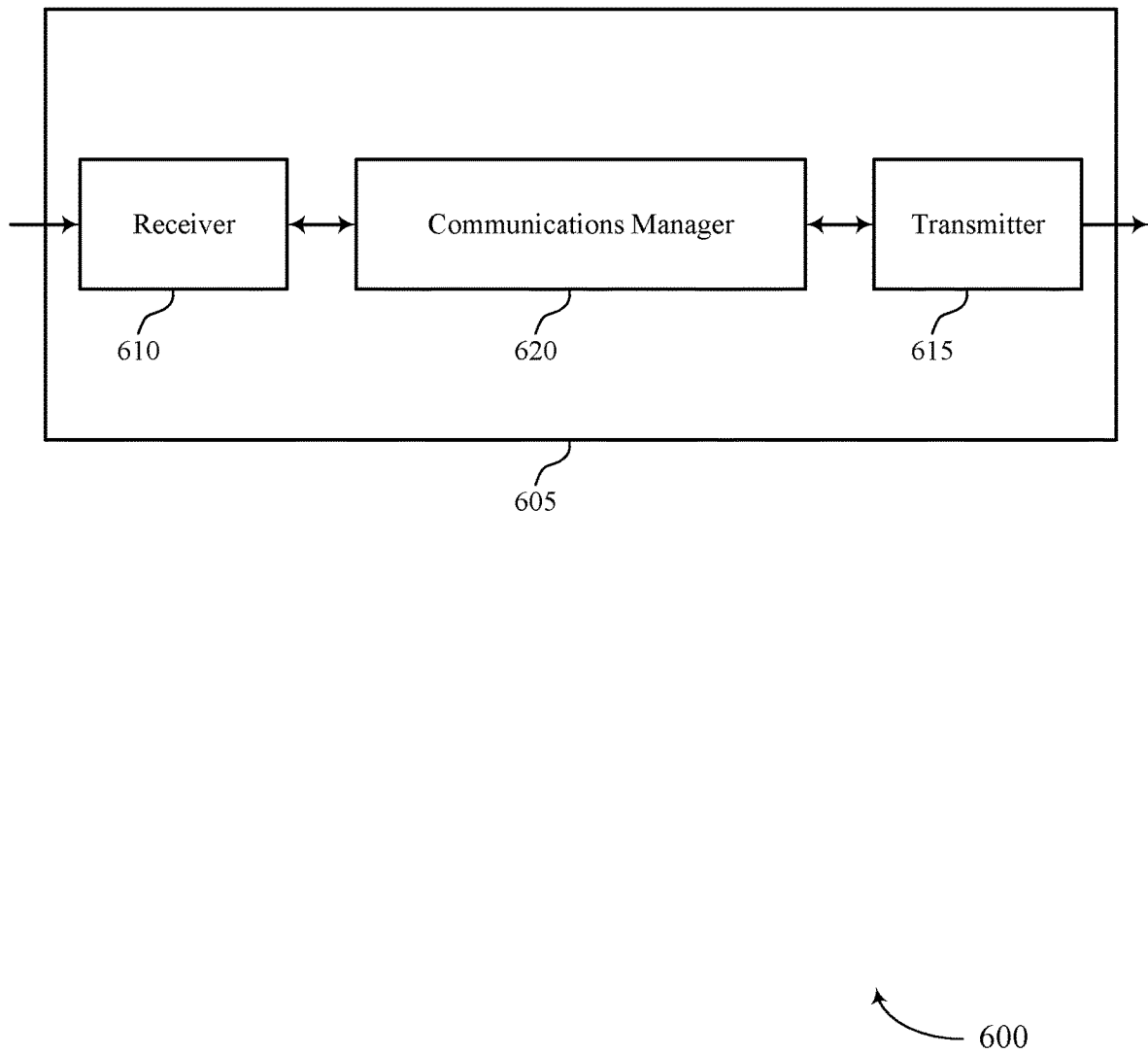
FIGS. 6 and 7 show block diagrams of devices that support random access configuration associated with cross-link interference in accordance with aspects of the present disclosure.

FIG. 6 shows a block diagram 600 of a device 605 that supports random access configuration associated with cross-link interference in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to random access configuration associated with cross-link interference). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to random access configuration associated with cross-link interference). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of random access configuration associated with cross-link interference as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a wireless device in accordance with examples as disclosed herein. For example, the communications manager 620 may be configured as or otherwise support a means for receiving, from a base station, control signaling indicating a set of multiple synchronization signal block occasions associated with measuring downlink reference signals, and a set of multiple interference measurement occasions associated with measuring cross-link interference. The communications manager 620 may be configured as or otherwise support a means for performing a first set of multiple measurements of a set of multiple downlink reference signals received via the set of multiple synchronization signal block occasions, and a second set of multiple measurements of a set of multiple reference signals received via the set of multiple interference measurement occasions. The communications manager 620 may be configured as or otherwise support a means for selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams. The communications manager 620 may be configured as or otherwise support a means for transmitting, to the base station, a random access message via the first random access occasion using the first beam.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for random access procedures resulting in improved beam and resource selection, more efficient utilization of available system resources, increased reliability of random access procedures, decreased system delays, and improved user experience.

Figure 7:
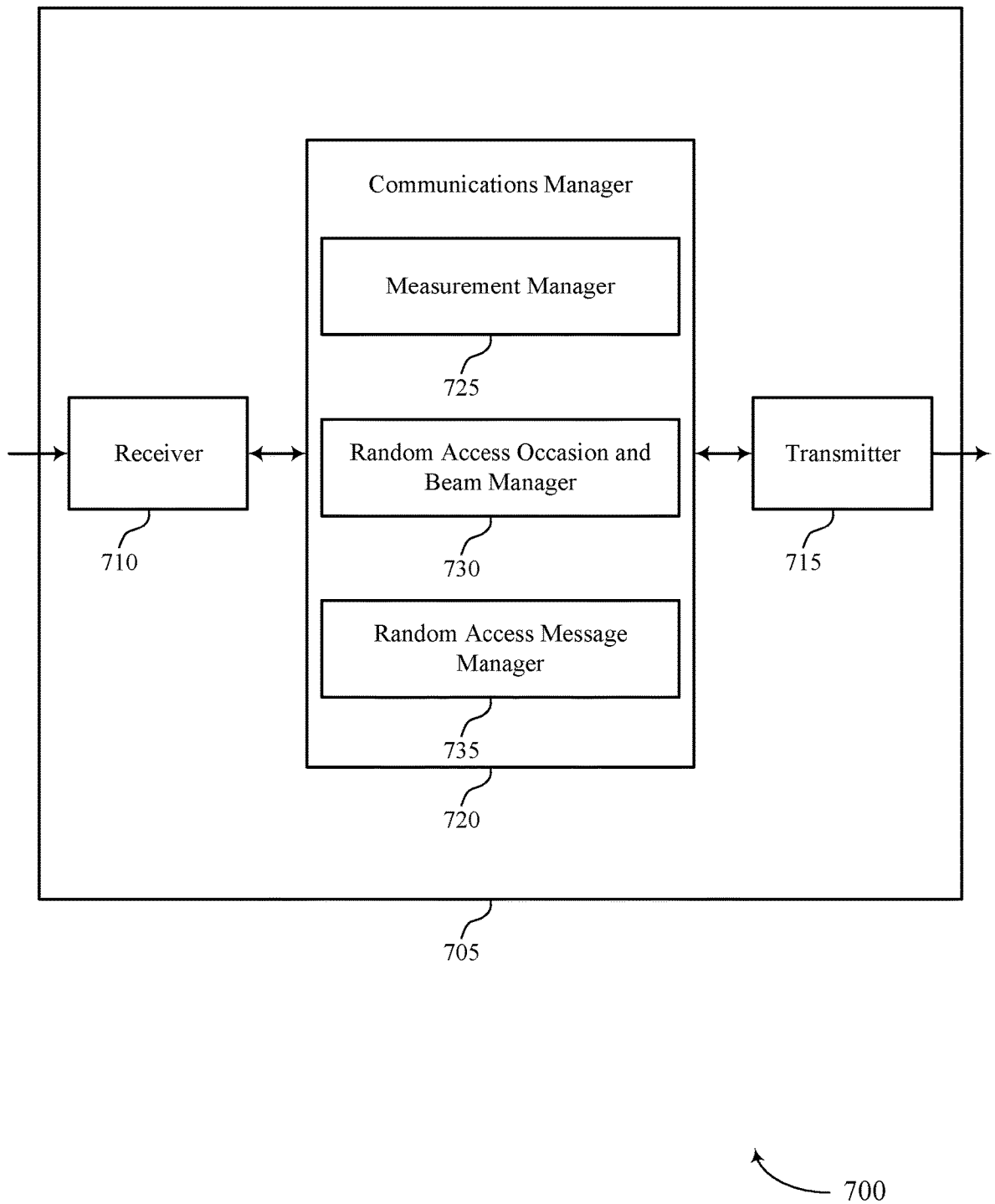

FIG. 7 shows a block diagram 700 of a device 705 that supports random access configuration associated with cross-link interference in accordance with aspects of the present disclosure. The device 705 may be an example of aspects of a device 605 or a wireless device, such as a UE 115 or an IAB node, as described herein. The device 705 may include a receiver 710, a transmitter 715, and a communications manager 720. The device 705 may also include a processor.

Each of these components may be in communication with one another (e.g., via one or more buses).

The receiver 710 may provide a means for receiving information such as packets, user data, control information, or any combination thereof associated with various information channels (e.g., control channels, data channels, information channels related to random access configuration associated with cross-link interference). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to random access configuration associated with cross-link interference). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of random access configuration associated with cross-link interference as described herein. For example, the communications manager 720 may include a measurement manager 725, a random access occasion and beam manager 730, a random access message manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a wireless device in accordance with examples as disclosed herein. The measurement manager 725 may be configured as or otherwise support a means for receiving, from a base station, control signaling indicating a set of multiple synchronization signal block occasions associated with measuring downlink reference signals, and a set of multiple interference measurement occasions associated with measuring cross-link interference. The measurement manager 725 may be configured as or otherwise support a means for performing a first set of multiple measurements of a set of multiple downlink reference signals received via the set of multiple synchronization signal block occasions, and a second set of multiple measurements of a set of multiple reference signals received via the set of multiple interference measurement occasions. The random access occasion and beam manager 730 may be configured as or otherwise support a means for selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams. The random access message manager 735 may be configured as or otherwise support a means for transmitting, to the base station, a random access message via the first random access occasion using the first beam.

Figure 8:
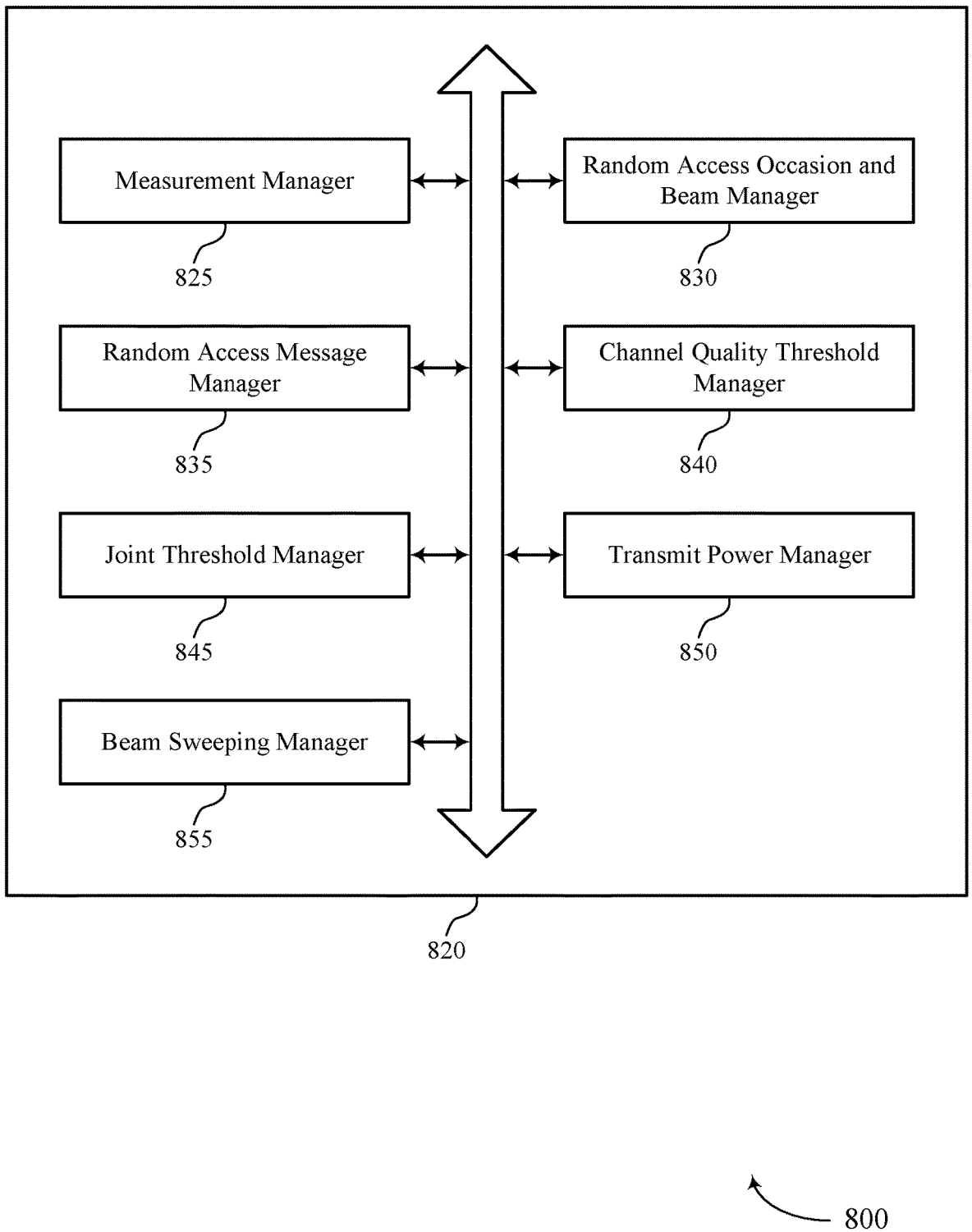
FIG. 8 shows a block diagram of a communications manager that supports random access configuration associated with cross-link interference in accordance with aspects of the present disclosure.

FIG. 8 shows a block diagram 800 of a communications manager 820 that supports random access configuration associated with cross-link interference in accordance with aspects of the present disclosure. The communications manager 820 may be an example of aspects of a communications manager 620, a communications manager 720, or both, as described herein. The communications manager 820, or various components thereof, may be an example of means for performing various aspects of random access configuration associated with cross-link interference as described herein. For example, the communications manager 820 may include a measurement manager 825, a random access occasion and beam manager 830, a random access message manager 835, a channel quality threshold manager 840, a joint threshold manager 845, a transmit power manager 850, a beam sweeping manager 855, or any combination thereof. Each of these components may communicate, directly or indirectly, with one another (e.g., via one or more buses).

The communications manager 820 may support wireless communications at a wireless device in accordance with examples as disclosed herein. The measurement manager 825 may be configured as or otherwise support a means for receiving, from a base station, control signaling indicating a set of multiple synchronization signal block occasions associated with measuring downlink reference signals, and a set of multiple interference measurement occasions associated with measuring cross-link interference. In some examples, the measurement manager 825 may be configured as or otherwise support a means for performing a first set of multiple measurements of a set of multiple downlink reference signals received via the set of multiple synchronization signal block occasions, and a second set of multiple measurements of a set of multiple reference signals received via the set of multiple interference measurement occasions. The random access occasion and beam manager 830 may be configured as or otherwise support a means for selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams. The random access message manager 835 may be configured as or otherwise support a means for transmitting, to the base station, a random access message via the first random access occasion using the first beam.

In some examples, the channel quality threshold manager 840 may be configured as or otherwise support a means for receiving, from the base station, the control signaling indicating a downlink channel quality threshold and a cross-link interference threshold, where selecting the first random access occasion is based on at least one of the first set of multiple measurements satisfying downlink channel quality threshold and at least one of the second set of multiple measurements satisfying the cross-link interference threshold.

In some examples, the joint threshold manager 845 may be configured as or otherwise support a means for receiving, from the base station, control signaling indicating a joint threshold associated with downlink channel quality and cross-link interference, where selecting the first random access occasion is based on a combination of a first measurement of the first set of multiple measurements and a second measurement of the second set of multiple measurements satisfying the joint threshold.

In some examples, to support selecting, the random access occasion and beam manager 830 may be configured as or otherwise support a means for selecting the first random access occasion that is a full duplex random access occasion based on at least one of the first set of multiple measurements satisfying a downlink channel quality threshold and at least one of the second set of multiple measurements satisfying a cross-link interference threshold.

In some examples, to support selecting, the random access occasion and beam manager 830 may be configured as or otherwise support a means for selecting the first random access occasion that is a half-duplex random access occasion based on at least one of the first set of multiple measurements satisfying a downlink channel quality threshold and at least one of the second set of multiple measurements failing to satisfy a cross-link interference threshold.

In some examples, the transmit power manager 850 may be configured as or otherwise support a means for receiving, from the base station, power control configuration information including at least one of a first step-size for reducing transmit power, a second step-size for increasing transmit power, a threshold measurement value for the second set of multiple measurements based on which the wireless device is instructed to adjust a transmit power, a threshold transmit power, or any combination thereof.

In some examples, the transmit power manager 850 may be configured as or otherwise support a means for refraining from transmitting the random access message at a transmit power that exceeds the threshold transmit power based on the second set of multiple measurements failing to satisfy a cross-link interference threshold.

In some examples, the transmit power manager 850 may be configured as or otherwise support a means for retransmitting the random access message at a transmit power that exceeds the threshold transmit power by the second step-size based on the second set of multiple measurements satisfying a cross-link interference threshold.

In some examples, the transmit power manager 850 may be configured as or otherwise support a means for reducing the transmit power for transmitting the random access message by the first step-size for reducing transmit power based on the second set of multiple measurements failing to satisfy a cross-link interference threshold.

In some examples, to support transmitting the random access message, the random access message manager 835 may be configured as or otherwise support a means for transmitting the random access message during an initial access procedure.

In some examples, to support transmitting the random access message, the random access message manager 835 may be configured as or otherwise support a means for transmitting the random access message during a beam failure recovery procedure.

In some examples, to support selecting, the random access occasion and beam manager 830 may be configured as or otherwise support a means for identifying a first candidate beam based on the first set of multiple measurements. In some examples, to support selecting, the random access occasion and beam manager 830 may be configured as or otherwise support a means for identifying a second candidate beam that has a quasi-co-location relationship with the first candidate beam. In some examples, to support selecting, the random access occasion and beam manager 830 may be configured as or otherwise support a means for selecting one of the first candidate beam or the second candidate beam as the first beam based on the second set of multiple measurements.

In some examples, the measurement manager 825 may be configured as or otherwise support a means for performing a third set of multiple measurements of the set of multiple downlink reference signals received via the set of multiple synchronization signal block occasions using the first beam, where transmitting the random access message using the first beam is based on the third set of multiple measurements.

In some examples, the measurement manager 825 may be configured as or otherwise support a means for estimating a measurement offset value associated with the first beam. In some examples, the measurement manager 825 may be configured as or otherwise support a means for applying the estimated measurement offset value to the first set of multiple measurements, where transmitting the random access message on the first random access occasion is based on applying the estimated measurement offset value to the first set of multiple measurements.

In some examples, the beam sweeping manager 855 may be configured as or otherwise support a means for performing a beam sweeping procedure using the a set of multiple candidate beams including the second candidate beam to receive a subset of the set of multiple reference signals.

In some examples, to support receiving the control signaling, the beam sweeping manager 855 may be configured as or otherwise support a means for receiving the control signaling including an indication of a periodicity and a repetition count for the set of multiple interference measurement occasions.

Figure 9:
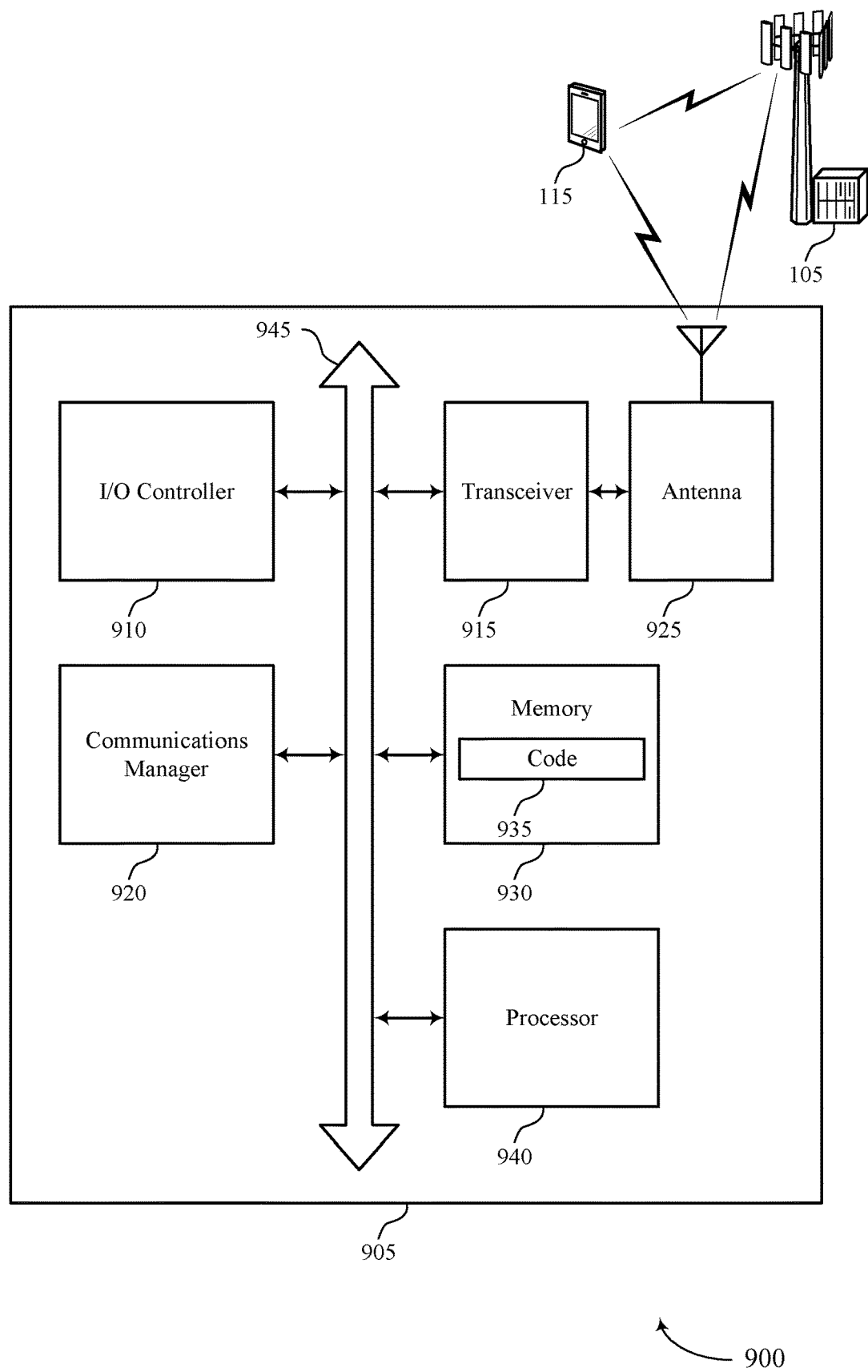
FIG. 9 shows a diagram of a system including a device that supports random access configuration associated with cross-link interference in accordance with aspects of the present disclosure.

FIG. 9 shows a diagram of a system 900 including a device 905 that supports random access configuration associated with cross-link interference in accordance with aspects of the present disclosure. The device 905 may be an example of or include the components of a device 605, a device 705, or a wireless device, such as a UE 115 or an IAB node as described herein. The device 905 may communicate wirelessly with one or more base stations 105, UEs 115, IAB nodes, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting random access configuration associated with cross-link interference). For example, the device 905 or a component of the device 905 may include a processor 940 and memory 930 coupled to the processor 940, the processor 940 and memory 930 configured to perform various functions described herein.

The communications manager 920 may support wireless communications at a wireless device in accordance with examples as disclosed herein. For example, the communications manager 920 may be configured as or otherwise support a means for receiving, from a base station, control signaling indicating a set of multiple synchronization signal block occasions associated with measuring downlink reference signals, and a set of multiple interference measurement occasions associated with measuring cross-link interference. The communications manager 920 may be configured as or otherwise support a means for performing a first set of multiple measurements of a set of multiple downlink reference signals received via the set of multiple synchronization signal block occasions, and a second set of multiple measurements of a set of multiple reference signals received via the set of multiple interference measurement occasions. The communications manager 920 may be configured as or otherwise support a means for selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams. The communications manager 920 may be configured as or otherwise support a means for transmitting, to the base station, a random access message via the first random access occasion using the first beam.

By including or configuring the communications manager 920 in accordance with examples as described herein, the device 905 may support techniques for random access procedures resulting in improved beam and resource selection, more efficient utilization of available system resources, increased reliability of random access procedures, decreased system delays, and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of random access configuration associated with cross-link interference as described herein, or the processor 940 and the memory 930 may be otherwise configured to perform or support such operations.

Figure 10:
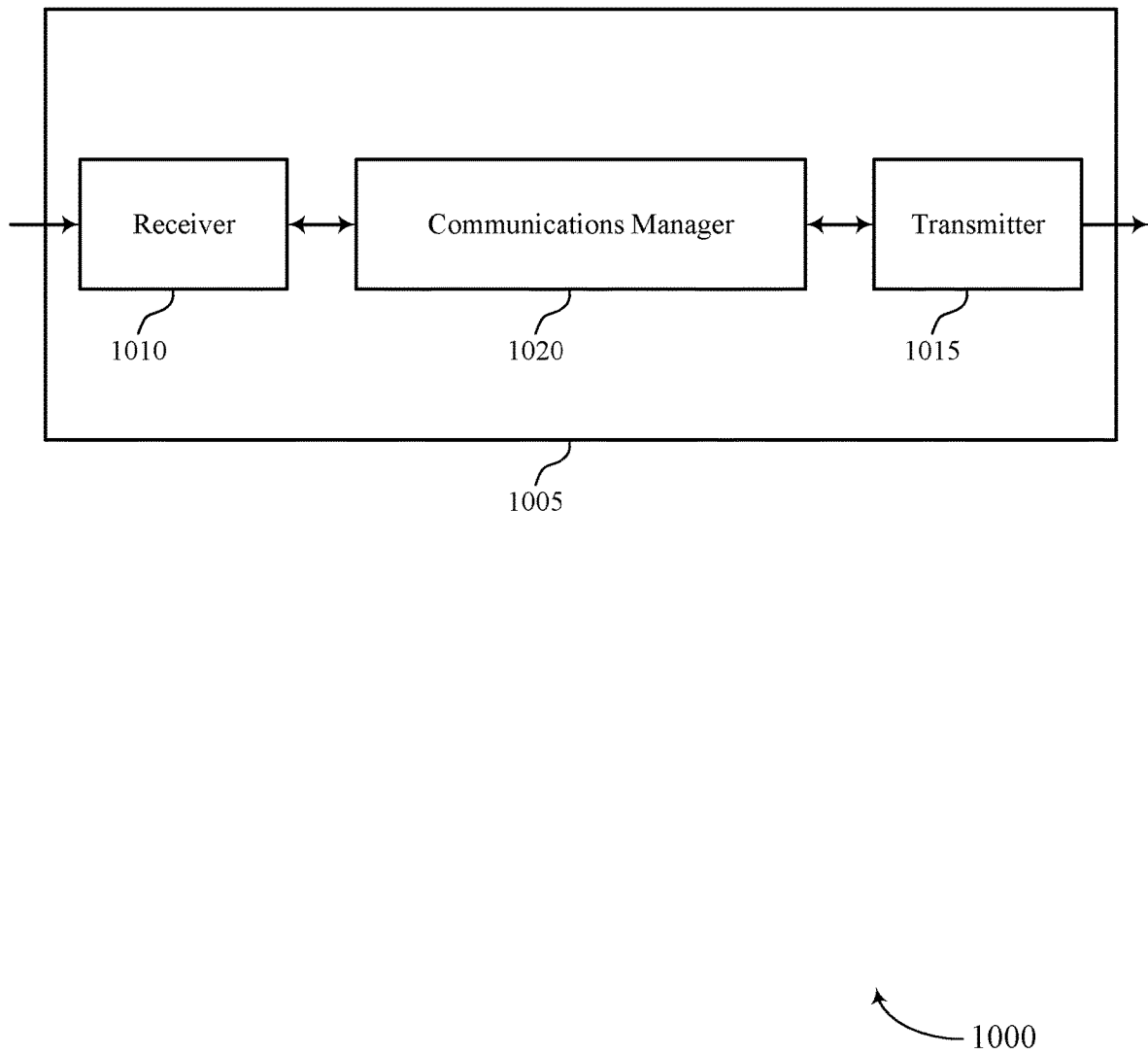
FIGS. 10 and 11 show block diagrams of devices that support random access configuration associated with cross-link interference in accordance with aspects of the present disclosure.

FIG. 10 shows a block diagram 1000 of a device 1005 that supports random access configuration associated with cross-link interference in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to random access configuration associated with cross-link interference). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to random access configuration associated with cross-link interference). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of random access configuration associated with cross-link interference as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a wireless device, control signaling indicating a set of multiple synchronization signal block occasions associated with measuring downlink reference signals, and a set of multiple interference measurement occasions associated with measuring cross-link interference. The communications manager 1020 may be configured as or otherwise support a means for receiving, from the wireless device on a first beam, a random access message via a first random access occasion associated with the first beam. The communications manager 1020 may be configured as or otherwise support a means for transmitting, to the wireless device responsive to receiving the random access message, a second random access message using the first beam.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for random access procedures resulting in improved beam and resource selection, more efficient utilization of available system resources, increased reliability of random access procedures, decreased system delays, and improved user experience.

Figure 11:
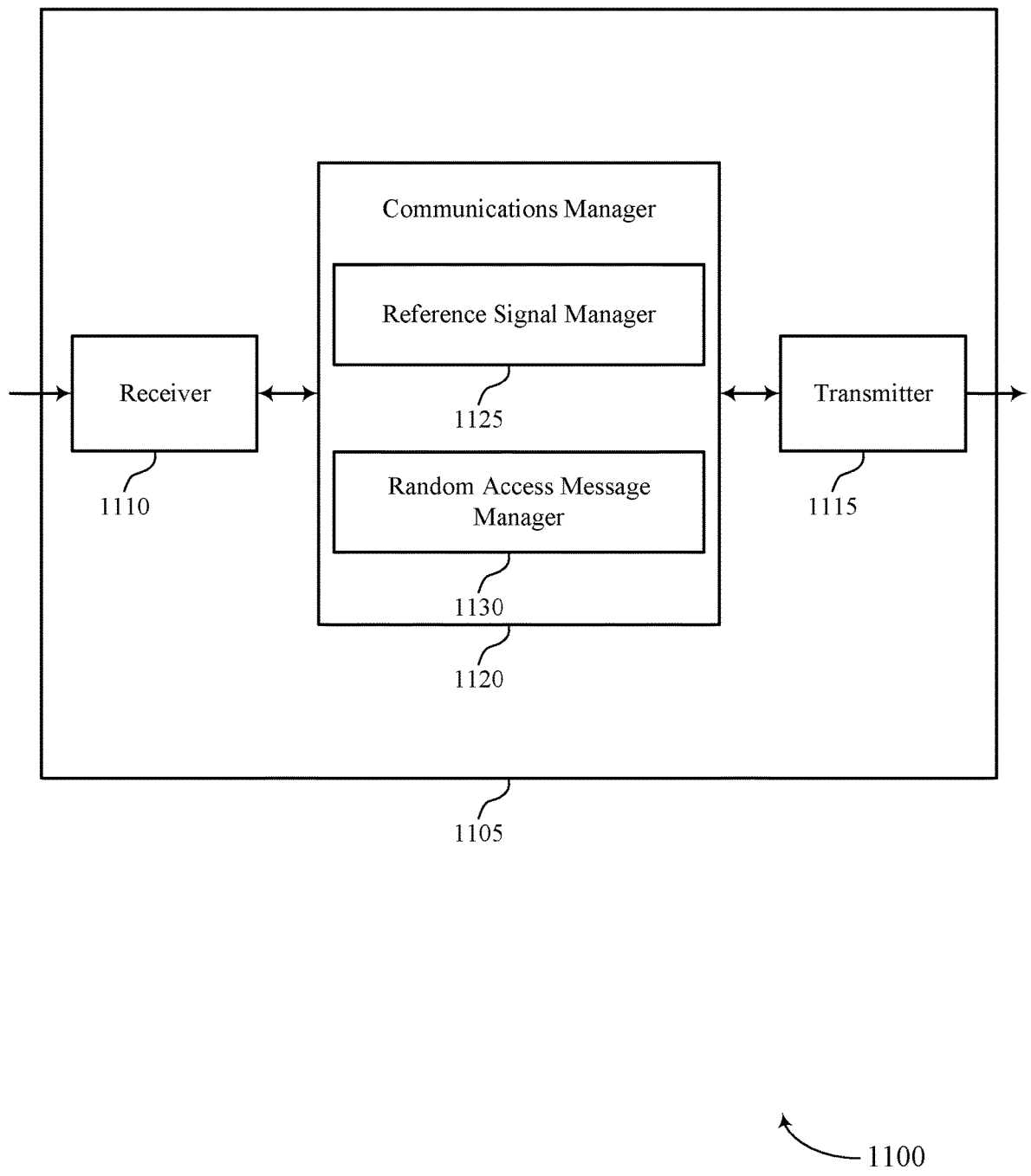

FIG. 11 shows a block diagram 1100 of a device 1105 that supports random access configuration associated with cross-link interference in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to random access configuration associated with cross-link interference). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to random access configuration associated with cross-link interference). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of random access configuration associated with cross-link interference as described herein. For example, the communications manager 1120 may include a reference signal manager 1125 a random access message manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The reference signal manager 1125 may be configured as or otherwise support a means for transmitting, to a wireless device, control signaling indicating a set of multiple synchronization signal block occasions associated with measuring downlink reference signals, and a set of multiple interference measurement occasions associated with measuring cross-link interference. The random access message manager 1130 may be configured as or otherwise support a means for receiving, from the wireless device on a first beam, a random access message via a first random access occasion associated with the first beam. The random access message manager 1130 may be configured as or otherwise support a means for transmitting, to the wireless device responsive to receiving the random access message, a second random access message using the first beam.

Figure 12:
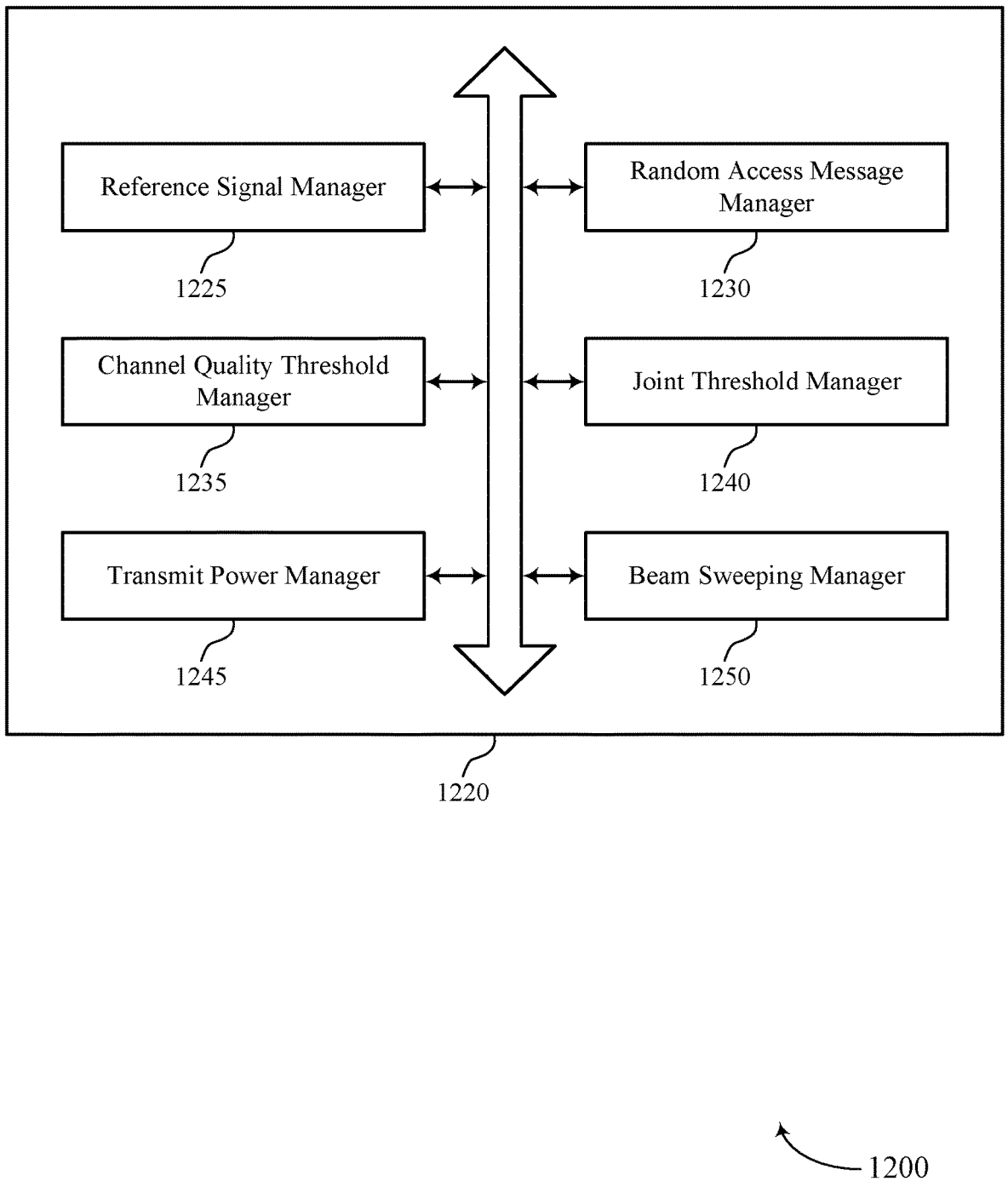
FIG. 12 shows a block diagram of a communications manager that supports random access configuration associated with cross-link interference in accordance with aspects of the present disclosure.

FIG. 12 shows a block diagram 1200 of a communications manager 1220 that supports random access configuration associated with cross-link interference in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of random access configuration associated with cross-link interference as described herein. For example, the communications manager 1220 may include a reference signal manager 1225, a random access message manager 1230, a channel quality threshold manager 1235, a joint threshold manager 1240, a transmit power manager 1245, a beam sweeping manager 1250, or any combination thereof. Each of these components may communicate, directly or indirectly, with one another (e.g., via one or more buses).

The communications manager 1220 may support wireless communications at a base station in accordance with examples as disclosed herein. The reference signal manager 1225 may be configured as or otherwise support a means for transmitting, to a wireless device, control signaling indicating a set of multiple synchronization signal block occasions associated with measuring downlink reference signals, and a set of multiple interference measurement occasions associated with measuring cross-link interference. The random access message manager 1230 may be configured as or otherwise support a means for receiving, from the wireless device on a first beam, a random access message via a first random access occasion associated with the first beam. In some examples, the random access message manager 1230 may be configured as or otherwise support a means for transmitting, to the wireless device responsive to receiving the random access message, a second random access message using the first beam.

In some examples, the channel quality threshold manager 1235 may be configured as or otherwise support a means for transmitting, to the wireless device, the control signaling indicating a downlink channel quality threshold and a cross-link interference threshold, where receiving the random access message via the first random access occasion is based on transmitting the control signaling indicating the downlink channel quality threshold and the cross-link interference threshold.

In some examples, the joint threshold manager 1240 may be configured as or otherwise support a means for transmitting, to the wireless device, the control signaling indicating a joint threshold associated with downlink channel quality and cross-link interference, where receiving the random access message via the first random access occasion is based on transmitting the control signaling indicating the joint threshold.

In some examples, the transmit power manager 1245 may be configured as or otherwise support a means for transmitting, to the wireless device, power control configuration information including at least one of a first step-size for reducing transmit power, a second step-size for increasing transmit power, a threshold measurement value for the second set of multiple measurements based on which the wireless device is instructed to adjust a transmit power, a threshold transmit power, or any combination thereof.

In some examples, the transmit power manager 1245 may be configured as or otherwise support a means for receiving a retransmission of the random access message at a transmit power that exceeds the threshold transmit power by the second step-size based on a cross-link interference threshold being satisfied.

In some examples, the transmit power manager 1245 may be configured as or otherwise support a means for receiving the random access message at a transmit power that is reduced by the first step-size for reducing transmit power.

In some examples, to support receiving the random access message, the random access message manager 1230 may be configured as or otherwise support a means for receiving the random access message during an initial access procedure.

In some examples, to support receiving the random access message, the random access message manager 1230 may be configured as or otherwise support a means for receiving the random access message during a beam failure recovery procedure.

In some examples, to support transmitting the control signaling, the beam sweeping manager 1250 may be configured as or otherwise support a means for transmitting the control signaling including an indication of a periodicity and a repetition count for the set of multiple interference measurement occasions.

Figure 13:
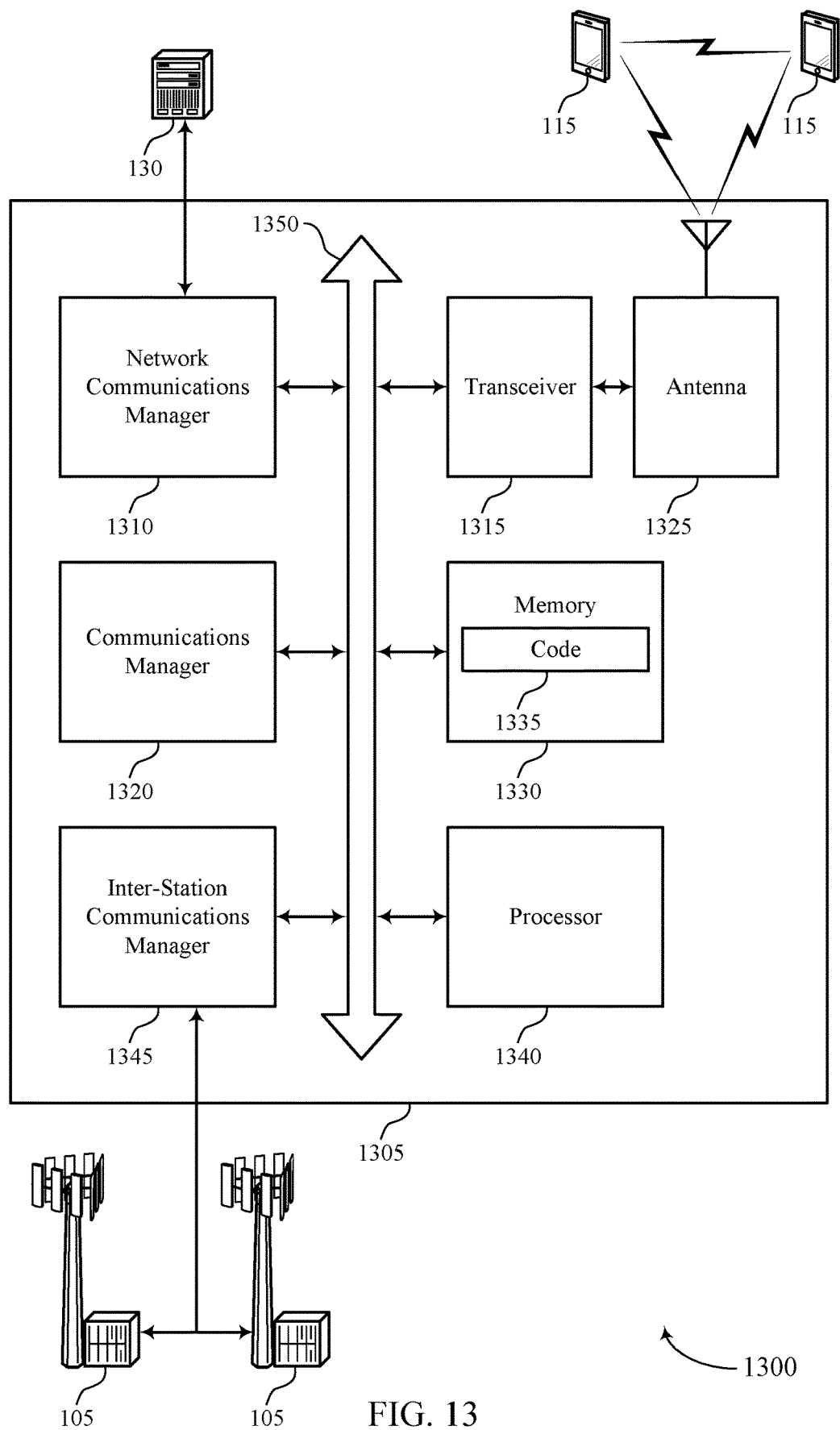
FIG. 13 shows a diagram of a system including a device that supports random access configuration associated with cross-link interference in accordance with aspects of the present disclosure.

FIG. 13 shows a diagram of a system 1300 including a device 1305 that supports random access configuration associated with cross-link interference in accordance with aspects of the present disclosure. The device 1305 may be an example of or include the components of a device 1005, a device 1105, or a base station 105 as described herein. The device 1305 may communicate wirelessly with one or more base stations 105, UEs 115, IAB nodes, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting random access configuration associated with cross-link interference). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with wireless devices, such as UEs 115 or IAB nodes, in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a wireless device, control signaling indicating a set of multiple synchronization signal block occasions associated with measuring downlink reference signals, and a set of multiple interference measurement occasions associated with measuring cross-link interference. The communications manager 1320 may be configured as or otherwise support a means for receiving, from the wireless device on a first beam, a random access message via a first random access occasion associated with the first beam. The communications manager 1320 may be configured as or otherwise support a means for transmitting, to the wireless device responsive to receiving the random access message, a second random access message using the first beam.

By including or configuring the communications manager 1320 in accordance with examples as described herein, the device 1305 may support techniques for random access procedures resulting in improved beam and resource selection, more efficient utilization of available system resources, increased reliability of random access procedures, decreased system delays, and improved user experience.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of random access configuration associated with cross-link interference as described herein, or the processor 1340 and the memory 1330 may be otherwise configured to perform or support such operations.

Figure 14:
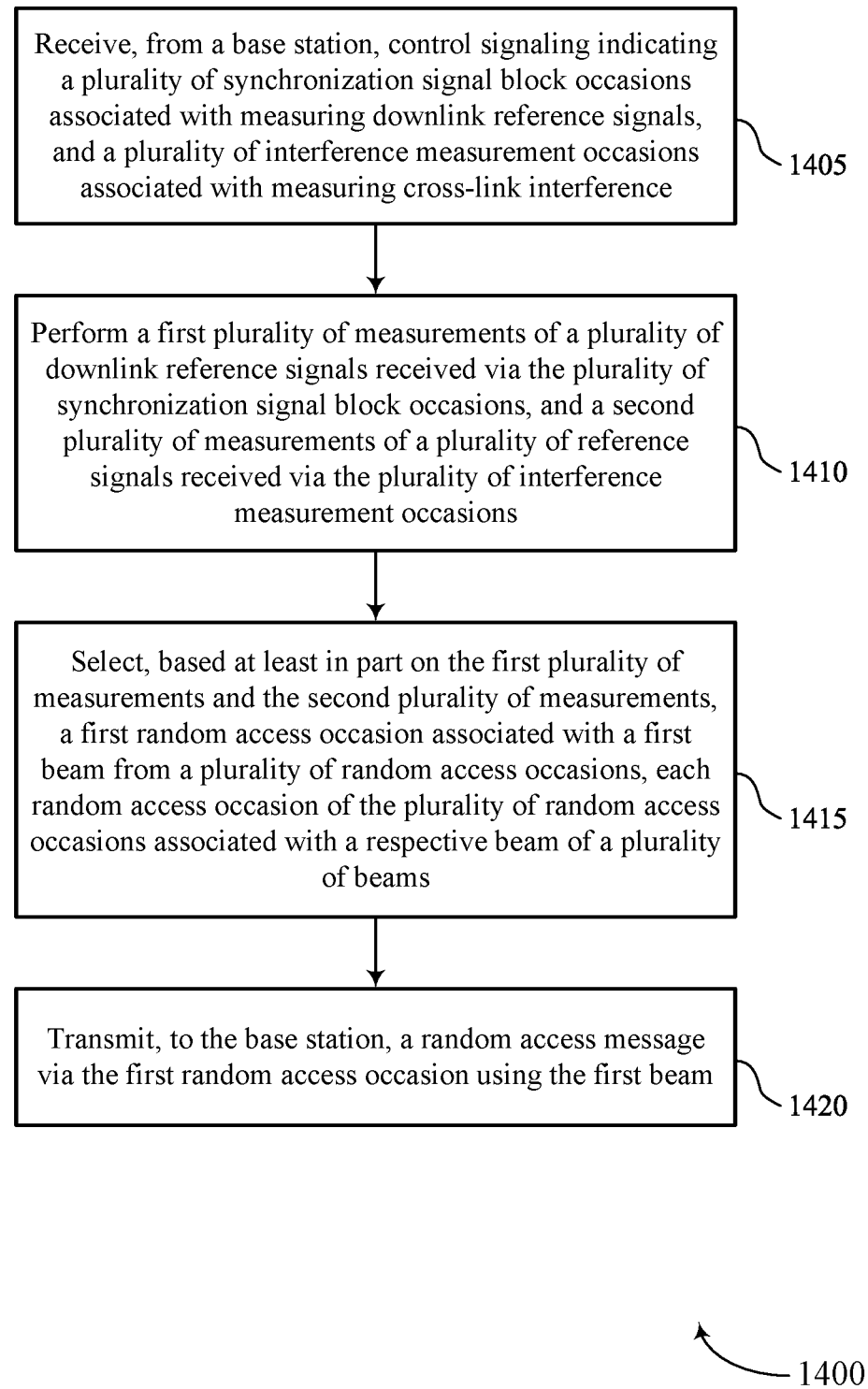
FIGS. 14 through 17 show flowcharts illustrating methods that support random access configuration associated with cross-link interference in accordance with aspects of the present disclosure.

FIG. 14 shows a flowchart illustrating a method 1400 that supports random access configuration associated with cross-link interference in accordance with aspects of the present disclosure. The operations of the method 1400 may be implemented by a wireless device or its components as described herein. For example, the operations of the method 1400 may be performed by a wireless device such as a UE 115 or an IAB node as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1405, the method may include receiving, from a base station, control signaling indicating a set of multiple synchronization signal block occasions associated with measuring downlink reference signals, and a set of multiple interference measurement occasions associated with measuring cross-link interference. The operations of 1405 may be performed in accordance with examples as disclosed herein. In some examples, aspects of the operations of 1405 may be performed by a measurement manager 825 as described with reference to FIG. 8.

At 1410, the method may include performing a first set of multiple measurements of a set of multiple downlink reference signals received via the set of multiple synchronization signal block occasions, and a second set of multiple measurements of a set of multiple reference signals received via the set of multiple interference measurement occasions. The operations of 1410 may be performed in accordance with examples as disclosed herein. In some examples, aspects of the operations of 1410 may be performed by a measurement manager 825 as described with reference to FIG. 8.

At 1415, the method may include selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams. The operations of 1415 may be performed in accordance with examples as disclosed herein. In some examples, aspects of the operations of 1415 may be performed by a random access occasion and beam manager 830 as described with reference to FIG. 8.

At 1420, the method may include transmitting, to the base station, a random access message via the first random access occasion using the first beam. The operations of 1420 may be performed in accordance with examples as disclosed herein. In some examples, aspects of the operations of 1420 may be performed by a random access message manager 835 as described with reference to FIG. 8.

Figure 15:
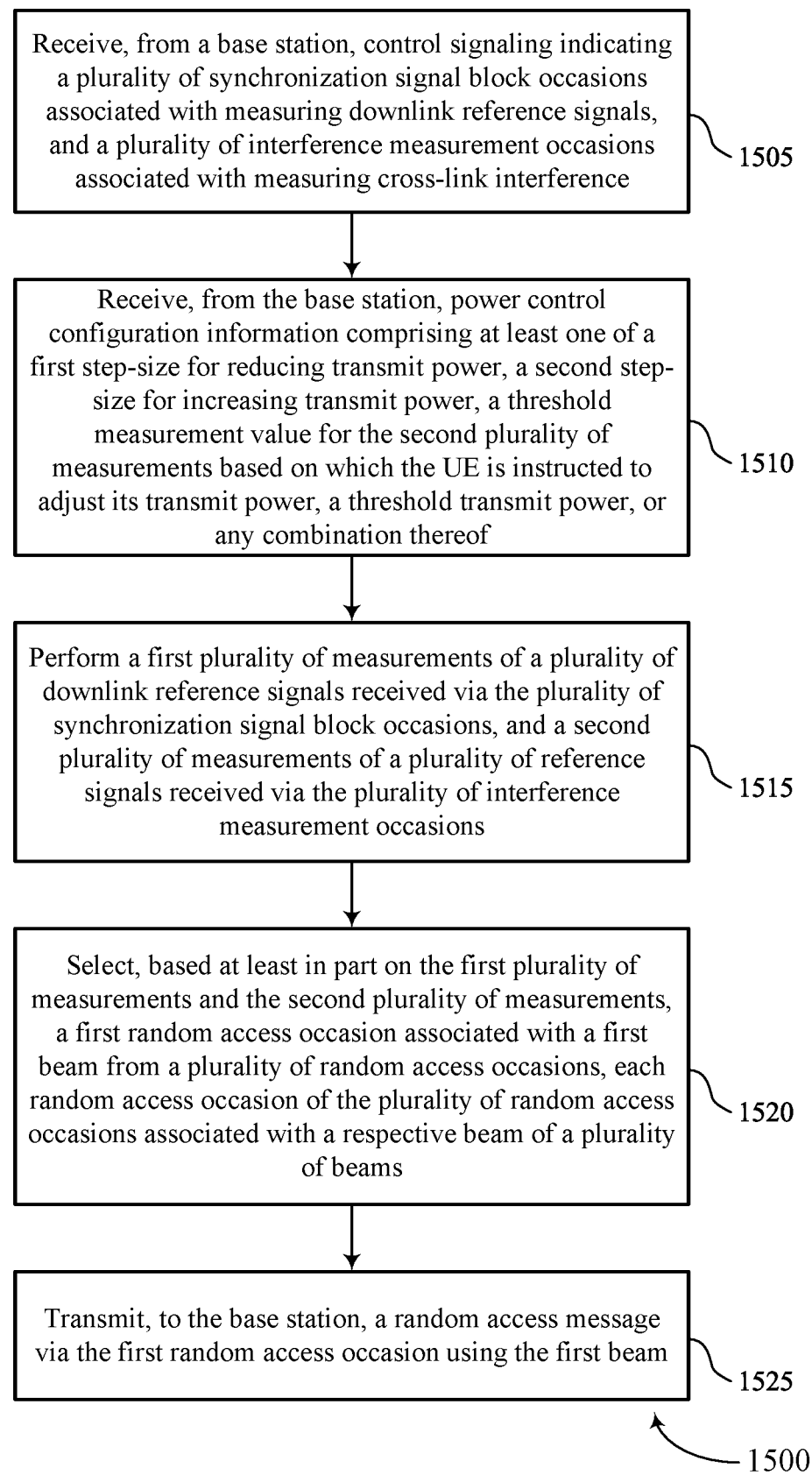

FIG. 15 shows a flowchart illustrating a method 1500 that supports random access configuration associated with cross-link interference in accordance with aspects of the present disclosure. The operations of the method 1500 may be implemented by a wireless device or its components as described herein. For example, the operations of the method 1500 may be performed by a wireless device, such as a UE 115 or an IAB node, as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1505, the method may include receiving, from a base station, control signaling indicating a set of multiple synchronization signal block occasions associated with measuring downlink reference signals, and a set of multiple interference measurement occasions associated with measuring cross-link interference. The operations of 1505 may be performed in accordance with examples as disclosed herein. In some examples, aspects of the operations of 1505 may be performed by a measurement manager 825 as described with reference to FIG. 8.

At 1510, the method may include receiving, from the base station, power control configuration information including at least one of a first step-size for reducing transmit power, a second step-size for increasing transmit power, a threshold measurement value for the second set of multiple measurements based on which the wireless device is instructed to adjust its transmit power, a threshold transmit power, or any combination thereof. The operations of 1510 may be performed in accordance with examples as disclosed herein. In some examples, aspects of the operations of 1510 may be performed by a transmit power manager 850 as described with reference to FIG. 8.

At 1515, the method may include performing a first set of multiple measurements of a set of multiple downlink reference signals received via the set of multiple synchronization signal block occasions, and a second set of multiple measurements of a set of multiple reference signals received via the set of multiple interference measurement occasions. The operations of 1515 may be performed in accordance with examples as disclosed herein. In some examples, aspects of the operations of 1515 may be performed by a measurement manager 825 as described with reference to FIG. 8.

At 1520, the method may include selecting, based on the first set of multiple measurements and the second set of multiple measurements, a first random access occasion associated with a first beam from a set of multiple random access occasions, each random access occasion of the set of multiple random access occasions associated with a respective beam of a set of multiple beams. The operations of 1520 may be performed in accordance with examples as disclosed herein. In some examples, aspects of the operations of 1520 may be performed by a random access occasion and beam manager 830 as described with reference to FIG. 8.

At 1525, the method may include transmitting, to the base station, a random access message via the first random access occasion using the first beam. The operations of 1525 may be performed in accordance with examples as disclosed herein. In some examples, aspects of the operations of 1525 may be performed by a random access message manager 835 as described with reference to FIG. 8.

Figure 16:
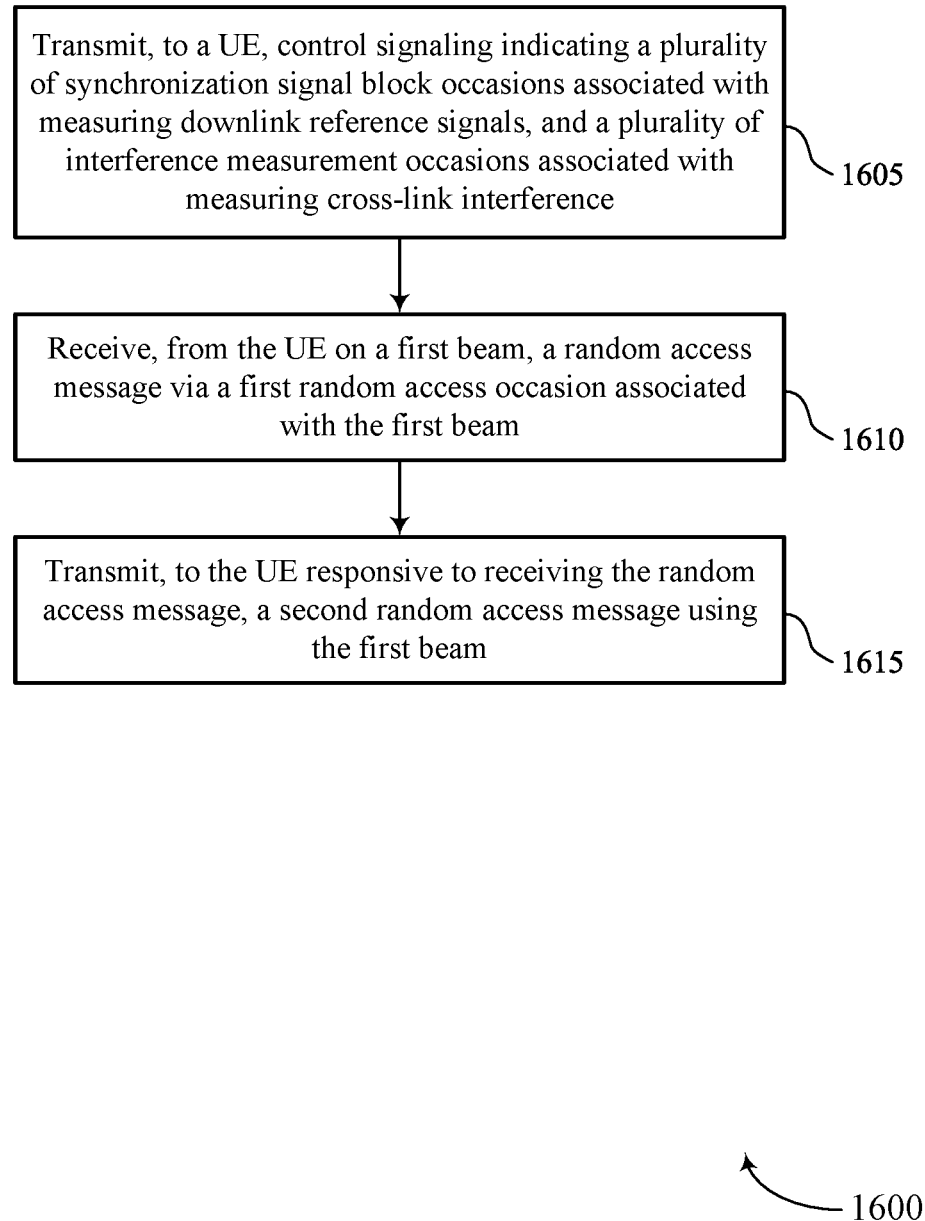

FIG. 16 shows a flowchart illustrating a method 1600 that supports random access configuration associated with cross-link interference in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1605, the method may include transmitting, to a wireless device, control signaling indicating a set of multiple synchronization signal block occasions associated with measuring downlink reference signals, and a set of multiple interference measurement occasions associated with measuring cross-link interference. The operations of 1605 may be performed in accordance with examples as disclosed herein. In some examples, aspects of the operations of 1605 may be performed by a reference signal manager 1225 as described with reference to FIG. 12.

At 1610, the method may include receiving, from the wireless device on a first beam, a random access message via a first random access occasion associated with the first beam. The operations of 1610 may be performed in accordance with examples as disclosed herein. In some examples, aspects of the operations of 1610 may be performed by a random access message manager 1230 as described with reference to FIG. 12.

At 1615, the method may include transmitting, to the wireless device responsive to receiving the random access message, a second random access message using the first beam. The operations of 1615 may be performed in accordance with examples as disclosed herein. In some examples, aspects of the operations of 1615 may be performed by a random access message manager 1230 as described with reference to FIG. 12.

Figure 17:
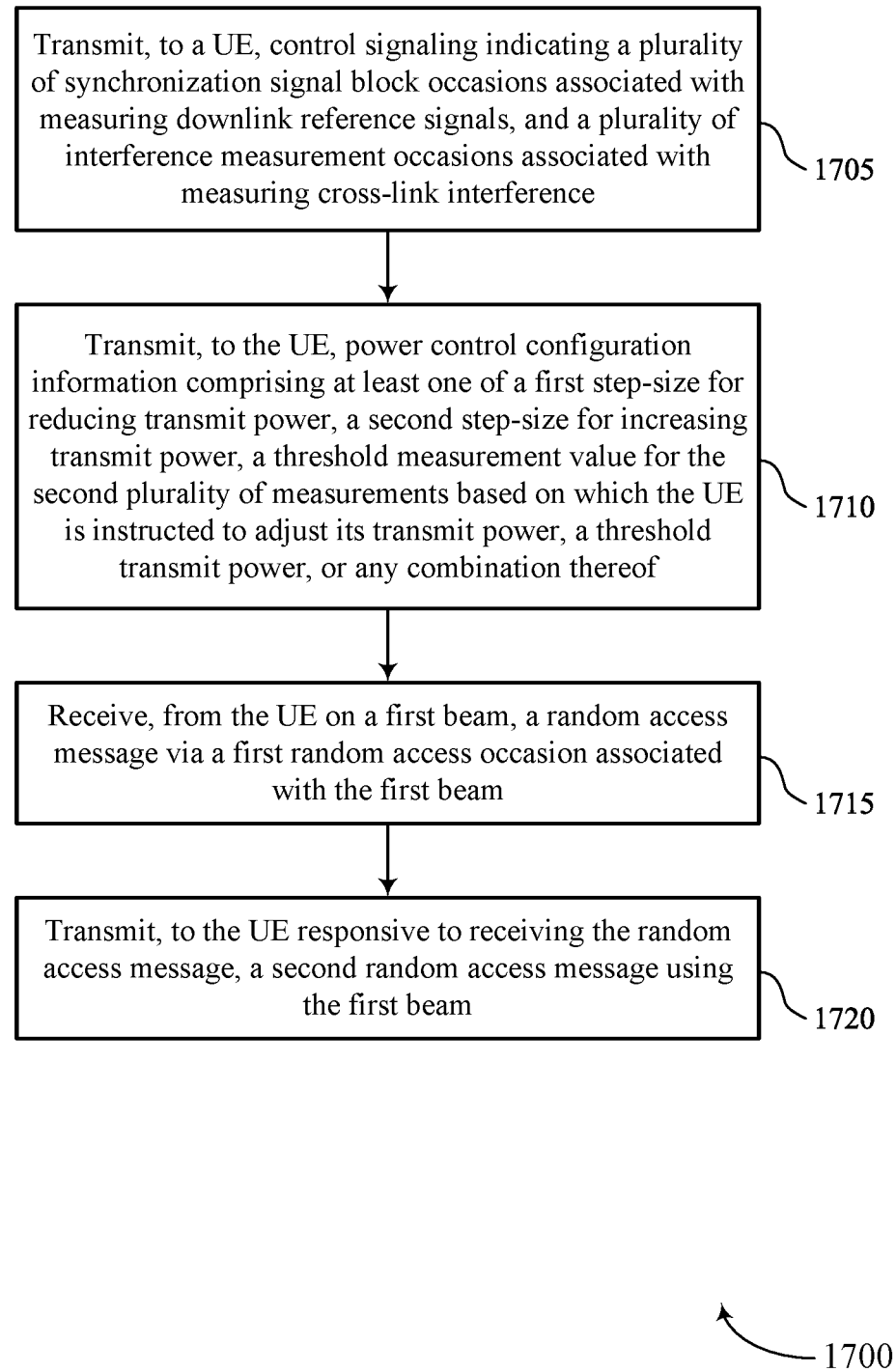

FIG. 17 shows a flowchart illustrating a method 1700 that supports random access configuration associated with cross-link interference in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include transmitting, to a wireless device, control signaling indicating a set of multiple synchronization signal block occasions associated with measuring downlink reference signals, and a set of multiple interference measurement occasions associated with measuring cross-link interference. The operations of 1705 may be performed in accordance with examples as disclosed herein. In some examples, aspects of the operations of 1705 may be performed by a reference signal manager 1225 as described with reference to FIG. 12.

At 1710, the method may include transmitting, to the wireless device, power control configuration information including at least one of a first step-size for reducing transmit power, a second step-size for increasing transmit power, a threshold measurement value for the second set of multiple measurements based on which the wireless device is instructed to adjust its transmit power, a threshold transmit power, or any combination thereof. The operations of 1710 may be performed in accordance with examples as disclosed herein. In some examples, aspects of the operations of 1710 may be performed by a transmit power manager 1245 as described with reference to FIG. 12.

At 1715, the method may include receiving, from the wireless device on a first beam, a random access message via a first random access occasion associated with the first beam. The operations of 1715 may be performed in accordance with examples as disclosed herein. In some examples, aspects of the operations of 1715 may be performed by a random access message manager 1230 as described with reference to FIG. 12.

At 1720, the method may include transmitting, to the wireless device responsive to receiving the random access message, a second random access message using the first beam. The operations of 1720 may be performed in accordance with examples as disclosed herein. In some examples, aspects of the operations of 1720 may be performed by a random access message manager 1230 as described with reference to FIG. 12.

The following provides an overview of aspects of the present disclosure:

Aspect 1: A method for wireless communications at a wireless device, comprising: receiving, from a base station, control signaling indicating a plurality of synchronization signal block occasions associated with measuring downlink reference signals, and a plurality of interference measurement occasions associated with measuring cross-link interference; performing a first plurality of measurements of a plurality of downlink reference signals received via the plurality of synchronization signal block occasions, and a second plurality of measurements of a plurality of reference signals received via the plurality of interference measurement occasions; selecting, based at least in part on the first plurality of measurements and the second plurality of measurements, a first random access occasion associated with a first beam from a plurality of random access occasions, each random access occasion of the plurality of random access occasions associated with a respective beam of a plurality of beams; and transmitting, to the base station, a random access message via the first random access occasion using the first beam.

Aspect 2: The method of aspect 1, further comprising: receiving, from the base station, the control signaling indicating a downlink channel quality threshold and a cross-link interference threshold, wherein selecting the first random access occasion is based at least in part on at least one of the first plurality of measurements satisfying downlink channel quality threshold and at least one of the second plurality of measurements satisfying the cross-link interference threshold.

Aspect 3: The method of any of aspects 1 through 2, further comprising: receiving, from the base station, control signaling indicating a joint threshold associated with downlink channel quality and cross-link interference, wherein selecting the first random access occasion is based at least in part on a combination of a first measurement of the first plurality of measurements and a second measurement of the second plurality of measurements satisfying the joint threshold.

Aspect 4: The method of any of aspects 1 through 3, wherein the selecting comprises: selecting the first random access occasion that is a full duplex random access occasion based at least in part on at least one of the first plurality of measurements satisfying a downlink channel quality threshold and at least one of the second plurality of measurements satisfying a cross-link interference threshold.

Aspect 5: The method of any of aspects 1 through 4, wherein the selecting comprises: selecting the first random access occasion that is a half-duplex random access occasion based at least in part on at least one of the first plurality of measurements satisfying a downlink channel quality threshold and at least one of the second plurality of measurements failing to satisfy a cross-link interference threshold.

Aspect 6: The method of any of aspects 1 through 5, further comprising: receiving, from the base station, power control configuration information comprising at least one of a first step-size for reducing transmit power, a second step-size for increasing transmit power, a threshold measurement value for the second plurality of measurements based on which the wireless device is instructed to adjust its transmit power, a threshold transmit power, or any combination thereof.

Aspect 7: The method of aspect 6, further comprising: refraining from transmitting the random access message at a transmit power that exceeds the threshold transmit power based at least in part on the second plurality of measurements failing to satisfy a cross-link interference threshold.

Aspect 8: The method of any of aspects 6 through 7, further comprising: retransmitting the random access message at a transmit power that exceeds the threshold transmit power by the second step-size based at least in part on the second plurality of measurements satisfying a cross-link interference threshold.

Aspect 9: The method of any of aspects 6 through 8, further comprising: reducing the transmit power for transmitting the random access message by the first step-size for reducing transmit power based at least in part on the second plurality of measurements failing to satisfy a cross-link interference threshold.

Aspect 10: The method of any of aspects 1 through 9, wherein transmitting the random access message comprises: transmitting the random access message during an initial access procedure.

Aspect 11: The method of any of aspects 1 through 10, wherein transmitting the random access message comprises: transmitting the random access message during a beam failure recovery procedure.

Aspect 12: The method of any of aspects 1 through 11, wherein the selecting further comprises: identifying a first candidate beam based at least in part on the first plurality of measurements; identifying a second candidate beam that has a quasi-co-location relationship with the first candidate beam; and selecting one of the first candidate beam or the second candidate beam as the first beam based at least in part on the second plurality of measurements.

Aspect 13: The method of aspect 12, further comprising: performing a third plurality of measurements of the plurality of downlink reference signals received via the plurality of synchronization signal block occasions using the first beam, wherein transmitting the random access message using the first beam is based at least in part on the third plurality of measurements.

Aspect 14: The method of any of aspects 12 through 13, further comprising: estimating a measurement offset value associated with the first beam; and applying the estimated measurement offset value to the first plurality of measurements, wherein transmitting the random access message on the first random access occasion is based at least in part on applying the estimated measurement offset value to the first plurality of measurements.

Aspect 15: The method of any of aspects 12 through 14, further comprising: performing a beam sweeping procedure using the plurality of beams comprising the second candidate beam to receive a subset of the plurality of reference signals.

Aspect 16: The method of aspect 15, wherein receiving the control signaling comprises: receiving the control signaling comprising an indication of a periodicity and a repetition count for the plurality of interference measurement occasions.

Aspect 17: A method for wireless communications at a base station, comprising: transmitting, to a wireless device, control signaling indicating a plurality of synchronization signal block occasions associated with measuring downlink reference signals, and a plurality of interference measurement occasions associated with measuring cross-link interference; receiving, from the wireless device on a first beam, a random access message via a first random access occasion associated with the first beam; and transmitting, to the wireless device responsive to receiving the random access message, a second random access message using the first beam.

Aspect 18: The method of aspect 17, further comprising: transmitting, to the wireless device, the control signaling indicating a downlink channel quality threshold and a cross-link interference threshold, wherein receiving the random access message via the first random access occasion is based at least in part on transmitting the control signaling indicating the downlink channel quality threshold and the cross-link interference threshold.

Aspect 19: The method of any of aspects 17 through 18, further comprising: transmitting, to the wireless device, the control signaling indicating a joint threshold associated with downlink channel quality and cross-link interference, wherein receiving the random access message via the first random access occasion is based at least in part on transmitting the control signaling indicating the joint threshold.

Aspect 20: The method of any of aspects 17 through 19, further comprising: transmitting, to the wireless device, power control configuration information comprising at least one of a first step-size for reducing transmit power, a second step-size for increasing transmit power, a threshold measurement value for a second plurality of measurements based on which the wireless device is instructed to adjust its transmit power, a threshold transmit power, or any combination thereof.

Aspect 21: The method of aspect 20, further comprising: receiving a retransmission of the random access message at a transmit power that exceeds the threshold transmit power by the second step-size based at least in part on a cross-link interference threshold being satisfied.

Aspect 22: The method of any of aspects 20 through 21, further comprising: receiving the random access message at a transmit power that is reduced by the first step-size for reducing transmit power.

Aspect 23: The method of any of aspects 17 through 22, wherein receiving the random access message comprises: receiving the random access message during an initial access procedure.

Aspect 24: The method of any of aspects 17 through 23, wherein receiving the random access message comprises: receiving the random access message during a beam failure recovery procedure.

Aspect 25: The method of any of aspects 17 through 24, wherein transmitting the control signaling comprises: transmitting the control signaling comprising an indication of a periodicity and a repetition count for the plurality of interference measurement occasions.

Aspect 26: An apparatus for wireless communications at a wireless device, comprising a processor; memory coupled with the processor; and instructions stored in the memory and executable by the processor to cause the apparatus to perform a method of any of aspects 1 through 16.

Aspect 27: An apparatus for wireless communications at a wireless device, comprising at least one means for performing a method of any of aspects 1 through 16.

Aspect 28: A non-transitory computer-readable medium storing code for wireless communications at a wireless device, the code comprising instructions executable by a processor to perform a method of any of aspects 1 through 16.

Aspect 29: An apparatus for wireless communications at a base station, comprising a processor; memory coupled with the processor; and instructions stored in the memory and executable by the processor to cause the apparatus to perform a method of any of aspects 17 through 25.

Aspect 30: An apparatus for wireless communications at a base station, comprising at least one means for performing a method of any of aspects 17 through 25.

Aspect 31: A non-transitory computer-readable medium storing code for wireless communications at a base station, the code comprising instructions executable by a processor to perform a method of any of aspects 17 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless device, comprising:

a processor;

memory coupled with the processor; and instructions stored in the memory and executable by the processor to cause the apparatus to:

receive, from a base station, control signaling indicating a plurality of synchronization signal block occasions associated with measuring downlink reference signals, and a plurality of interference measurement occasions associated with measuring cross-link interference;

perform a first plurality of measurements of a plurality of downlink reference signals received via the plurality of synchronization signal block occasions, and a second plurality of measurements of a plurality of reference signals received via the plurality of interference measurement occasions;

select, based at least in part on the first plurality of measurements and the second plurality of measurements, a first random access occasion associated with a first beam from a plurality of random access occasions, each random access occasion of the plurality of random access occasions associated with a respective beam of a plurality of beams; and transmit, to the base station, a random access message via the first random access occasion using the first beam.

2. The apparatus of claim 1, wherein the instructions are further executable by the processor to cause the apparatus to:

receive, from the base station, the control signaling indicating a downlink channel quality threshold and a cross-link interference threshold, wherein selecting the first random access occasion is based at least in part on at least one of the first plurality of measurements satisfying downlink channel quality threshold and at least one of the second plurality of measurements satisfying the cross-link interference threshold.

3. The apparatus of claim 1, wherein the instructions are further executable by the processor to cause the apparatus to:
receive, from the base station, control signaling indicating a joint threshold associated with downlink channel quality and cross-link interference, wherein selecting the first random access occasion is based at least in part on a combination of a first measurement of the first plurality of measurements and a second measurement of the second plurality of measurements satisfying the joint threshold.

4. The apparatus of claim 1, wherein the instructions to select are executable by the processor to cause the apparatus to:
select the first random access occasion that is a full duplex random access occasion based at least in part on at least one of the first plurality of measurements satisfying a downlink channel quality threshold and at least one of the second plurality of measurements satisfying a cross-link interference threshold.

5. The apparatus of claim 1, wherein the instructions to select are executable by the processor to cause the apparatus to:
select the first random access occasion that is a half-duplex random access occasion based at least in part on at least one of the first plurality of measurements satisfying a downlink channel quality threshold and at least one of the second plurality of measurements failing to satisfy a cross-link interference threshold.

6. The apparatus of claim 1, wherein the instructions are further executable by the processor to cause the apparatus to:
receive, from the base station, power control configuration information comprising at least one of a first step-size for reducing transmit power, a second step-size for increasing transmit power, a threshold measurement value for the second plurality of measurements based on which the wireless device is instructed to adjust its transmit power, a threshold transmit power, or any combination thereof.

7. The apparatus of claim 6, wherein the instructions are further executable by the processor to cause the apparatus to:
refrain from transmitting the random access message at a transmit power that exceeds the threshold transmit power based at least in part on the second plurality of measurements failing to satisfy a cross-link interference threshold.

8. The apparatus of claim 6, wherein the instructions are further executable by the processor to cause the apparatus to:
retransmit the random access message at a transmit power that exceeds the threshold transmit power by the second step-size based at least in part on the second plurality of measurements satisfying a cross-link interference threshold.

9. The apparatus of claim 6, wherein the instructions are further executable by the processor to cause the apparatus to:
reduce the transmit power for transmitting the random access message by the first step-size for reducing transmit power based at least in part on the second plurality of measurements failing to satisfy a cross-link interference threshold.

10. The apparatus of claim 1, wherein the instructions to transmit the random access message are executable by the processor to cause the apparatus to:
transmit the random access message during an initial access procedure.

11. The apparatus of claim 1, wherein the instructions to transmit the random access message are executable by the processor to cause the apparatus to:
transmit the random access message during a beam failure recovery procedure.

12. The apparatus of claim 1, wherein the instructions to select are further executable by the processor to cause the apparatus to:
identify a first candidate beam based at least in part on the first plurality of measurements;
identify a second candidate beam that has a quasi-co-location relationship with the first candidate beam; and
select one of the first candidate beam or the second candidate beam as the first beam based at least in part on the second plurality of measurements.

13. The apparatus of claim 12, wherein the instructions are further executable by the processor to cause the apparatus to:
perform a third plurality of measurements of the plurality of downlink reference signals received via the plurality of synchronization signal block occasions using the first beam, wherein transmitting the random access message using the first beam is based at least in part on the third plurality of measurements.

14. The apparatus of claim 12, wherein the instructions are further executable by the processor to cause the apparatus to:
estimate a measurement offset value associated with the first beam; and
apply the estimated measurement offset value to the first plurality of measurements, wherein transmitting the random access message on the first random access occasion is based at least in part on applying the estimated measurement offset value to the first plurality of measurements.

15. The apparatus of claim 12, wherein the instructions are further executable by the processor to cause the apparatus to:
perform a beam sweeping procedure using the plurality of beams comprising the second candidate beam to receive a subset of the plurality of reference signals.

16. The apparatus of claim 15, wherein the instructions to receive the control signaling are executable by the processor to cause the apparatus to:
receive the control signaling comprising an indication of a periodicity and a repetition count for the plurality of interference measurement occasions.

17. An apparatus for wireless communications at a base station, comprising:
a processor;
memory coupled with the processor; and
instructions stored in the memory and executable by the processor to cause the apparatus to:
transmit, to a wireless device, control signaling indicating a plurality of synchronization signal block occasions associated with measuring downlink reference signals, and a plurality of interference measurement occasions associated with measuring cross-link interference;
receive, from the wireless device on a first beam during an initial access procedure or a beam failure recovery procedure, a random access message via a first random access occasion associated with the first beam; and transmit, to the wireless device responsive to receiving the random access message, a second random access message using the first beam.

18. The apparatus of claim 17, wherein the instructions are further executable by the processor to cause the apparatus to:
transmit, to the wireless device, the control signaling indicating a downlink channel quality threshold and a cross-link interference threshold, wherein receiving the random access message via the first random access occasion is based at least in part on transmitting the control signaling indicating the downlink channel quality threshold and the cross-link interference threshold.

19. The apparatus of claim 17, wherein the instructions are further executable by the processor to cause the apparatus to:
transmit, to the wireless device, the control signaling indicating a joint threshold associated with downlink channel quality and cross-link interference, wherein receiving the random access message via the first random access occasion is based at least in part on transmitting the control signaling indicating the joint threshold.

20. The apparatus of claim 17, wherein the instructions are further executable by the processor to cause the apparatus to:
transmit, to the wireless device, power control configuration information comprising at least one of a first step-size for reducing transmit power, a second step-size for increasing transmit power, a threshold measurement value for a second plurality of measurements based on which the wireless device is instructed to adjust its transmit power, a threshold transmit power, or any combination thereof.

21. The apparatus of claim 20, wherein the instructions are further executable by the processor to cause the apparatus to:
receive a retransmission of the random access message at a transmit power that exceeds the threshold transmit power by the second step-size based at least in part on a cross-link interference threshold being satisfied.

22. The apparatus of claim 20, wherein the instructions are further executable by the processor to cause the apparatus to:
receive the random access message at a transmit power that is reduced by the first step-size for reducing transmit power.

23. The apparatus of claim 17, wherein the instructions to transmit the control signaling are executable by the processor to cause the apparatus to:
transmit the control signaling comprising an indication of a periodicity and a repetition count for the plurality of interference measurement occasions.

24. A method for wireless communications at a wireless device, comprising:
receiving, from a base station, control signaling indicating a plurality of synchronization signal block occasions associated with measuring downlink reference signals, and a plurality of interference measurement occasions associated with measuring cross-link interference;
performing a first plurality of measurements of a plurality of downlink reference signals received via the plurality of synchronization signal block occasions, and a second plurality of measurements of a plurality of reference signals received via the plurality of interference measurement occasions;
selecting, based at least in part on the first plurality of measurements and the second plurality of measurements, a first random access occasion associated with a first beam from a plurality of random access occasions, each random access occasion of the plurality of random access occasions associated with a respective beam of a plurality of beams; and
transmitting, to the base station, a random access message via the first random access occasion using the first beam.

25. The method of claim 24, further comprising:
receiving, from the base station, the control signaling indicating a downlink channel quality threshold and a cross-link interference threshold, wherein selecting the first random access occasion is based at least in part on at least one of the first plurality of measurements satisfying downlink channel quality threshold and at least one of the second plurality of measurements satisfying the cross-link interference threshold.

26. The method of claim 24, further comprising:
receiving, from the base station, control signaling indicating a joint threshold associated with downlink channel quality and cross-link interference, wherein selecting the first random access occasion is based at least in part on a combination of a first measurement of the first plurality of measurements and a second measurement of the second plurality of measurements satisfying the joint threshold.

27. A method for wireless communications at a base station, comprising:
transmitting, to a wireless device, control signaling indicating a plurality of synchronization signal block occasions associated with measuring downlink reference signals, and a plurality of interference measurement occasions associated with measuring cross-link interference;
receiving, from the wireless device on a first beam during an initial access procedure or a beam failure recovery procedure, a random access message via a first random access occasion associated with the first beam; and
transmitting, to the wireless device responsive to receiving the random access message, a second random access message using the first beam.

28. The method of claim 27, further comprising:
transmitting, to the wireless device, the control signaling indicating a downlink channel quality threshold and a cross-link interference threshold, wherein receiving the random access message via the first random access occasion is based at least in part on transmitting the control signaling indicating the downlink channel quality threshold and the cross-link interference threshold.

* * * * *